(12) United States Patent
Goto et al.

(10) Patent No.: US 7,713,343 B2
(45) Date of Patent: *May 11, 2010

(54) INK SET FOR INK-JET RECORDING

(75) Inventors: Kazuma Goto, Aichi (JP); Narumi Koga, Aichi (JP); Satoshi Okuda, Aichi (JP); Tomoyo Hamajima, Aichi (JP); Yasuhiro Taga, Aichi (JP); Shunichi Higashiyama, Mie (JP)

(73) Assignee: Brother Kogyo Kabushiki Kaisha (JP)

( * ) Notice: Subject to any disclaimer, the term of this patent is extended or adjusted under 35 U.S.C. 154(b) by 658 days.

This patent is subject to a terminal disclaimer.

(21) Appl. No.: 11/673,821

(22) Filed: Feb. 12, 2007

(65) Prior Publication Data

US 2007/0186806 A1 Aug. 16, 2007

(30) Foreign Application Priority Data

Feb. 16, 2006 (JP) .............................. 2006-038766

(51) Int. Cl.
*C09D 11/02* (2006.01)

(52) U.S. Cl. ................................ 106/31.48; 106/31.49

(58) Field of Classification Search ............... 106/31.48, 106/31.49
See application file for complete search history.

(56) References Cited

U.S. PATENT DOCUMENTS

| | | | |
|---|---|---|---|
| 3,336,285 A | 8/1967 | Towne et al. | |
| 3,853,895 A | 12/1974 | Lamm et al. | |
| 3,907,769 A | 9/1975 | Dehnert et al. | |
| 3,950,321 A | 4/1976 | Dehnert et al. | |
| 3,998,802 A | 12/1976 | Dehnert et al. | |
| 4,016,152 A | 4/1977 | Dehnert et al. | |
| 4,042,578 A | 8/1977 | Dehnert et al. | |
| 4,068,085 A | 1/1978 | Ramanathan et al. | |
| 4,128,545 A | 12/1978 | Dehnert et al. | |
| 5,144,015 A | 9/1992 | Chapman | |
| 6,365,720 B1 | 4/2002 | Schacht et al. | |
| 6,444,807 B1 | 9/2002 | Wolleb et al. | |
| 6,488,751 B1 | 12/2002 | Takemoto | |
| 6,495,250 B1 | 12/2002 | Schacht et al. | |
| 7,425,233 B2 * | 9/2008 | Hamajima et al. | 106/31.49 |
| 7,465,345 B2 * | 12/2008 | Okuda et al. | 106/31.28 |
| 2003/0105321 A1 | 6/2003 | Wolleb et al. | |
| 2003/0150354 A1 | 8/2003 | Ito et al. | |
| 2007/0186806 A1 * | 8/2007 | Goto et al. | 106/31.48 |
| 2007/0186807 A1 * | 8/2007 | Goto et al. | 106/31.48 |
| 2007/0186812 A1 * | 8/2007 | Koga et al. | 106/31.58 |
| 2007/0188573 A1 * | 8/2007 | Hamajima et al. | 106/31.48 |
| 2007/0188574 A1 * | 8/2007 | Kato et al. | 106/31.48 |
| 2009/0165673 A1 * | 7/2009 | Taniguchi et al. | 106/31.48 |

FOREIGN PATENT DOCUMENTS

| | | |
|---|---|---|
| EP | 1295917 A1 | 3/2003 |
| EP | 1384762 A1 | 1/2004 |
| EP | 1507405 A2 | 2/2005 |
| JP | 52-046230 | 11/1977 |
| JP | 2000-178491 | 6/2000 |
| JP | 2000-303009 | 10/2000 |
| JP | 2006-038748 | 2/2006 |
| JP | 2006-038752 | 2/2006 |

OTHER PUBLICATIONS

Elnagdi, et al., "Utility of Alpha, Beta-Unsaturated Nitriles in Heterocyclic Synthesis," Heterocycles, vol. 20, p. 519-550, (1983).
Hosoda, Shin Sentyo Kagaku (New Dye Chemistry), Gihodo, Dec. 21, 1973, p. 396-409.
EP Search Report mailed May 7, 2007, EP Appln. 07250610.8-2102.

* cited by examiner

*Primary Examiner*—Helene Klemanski
(74) *Attorney, Agent, or Firm*—Banner & Witcoff, Ltd.

(57) ABSTRACT

An ink set for ink-jet recording is formed from a yellow ink in which C. I. Direct Yellow 132 and C. I. Direct Yellow 86 are employed, a magenta ink in which a specific pyrazolylazopyridine-based (or pyrazolylazopyrazine-based) dye and another specific dye are employed, and a cyan ink in which two specific types of copper phthalocyanine-based dyes are employed.

10 Claims, No Drawings

INK SET FOR INK-JET RECORDING

BACKGROUND OF THE INVENTION

1. Field of the Invention

The present invention relates to an ink set for ink-jet recording, comprising a yellow ink containing a yellow coloring agent, water and a water soluble organic solvent; a magenta ink containing a magenta coloring agent, water and a water soluble organic solvent; and a cyan ink containing a cyan coloring agent, water and a water soluble organic solvent.

2. Description of the Related Art

Generally, inks employed for forming an ink-jet recorded image are required to satisfy the following ink-jet recording properties to a high degree:

(1) To provide a vivid image having excellent color developing properties.

(2) To provide excellent toughnesses properties such as light fastness, active gas (oxidizing gases such as NOx and ozone, SOx and the like) resistance, water resistance, and the like.

(3) To exhibit no problem when the inks contact various members employed in an ink-jet recording apparatus.

(4) To provide excellent storage stability, and stability of use over long time with minimal chance of clogging the nozzles of an ink head, thereby maintaining satisfactory ejection stability.

In particular, when a natural image or the like is represented by subtractive color mixing of yellow, magenta and cyan, it is highly required that the hues of yellow, magenta and cyan inks be close to the hues of standard yellow, standard magenta and standard cyan, respectively, and that each of the inks provides vivid color. It is required that a printed natural image and the like have excellent long-term storage stability such that excellent color developing properties and high optical densities can be maintained. Therefore, it is important that the inks not only have excellent light fastness and active gas resistance but also exhibit excellent hue balance. In particular, it is important that color fading properties of the yellow, magenta and cyan inks be well balanced. Hence, an ink set for ink-jet recording has been proposed in view of the above requirements (see U.S. Pat. No. 6,488,751).

However, in conventional technologies, an ink-jet recording ink of any of the yellow, magenta and cyan colors has a problem in that the toughnesses properties such as light fastness and active gas resistance are insufficient. Therefore, deterioration of the ink-jet recorded material may occur as a result of use of these conventional ink-jet recording inks.

It has been generally known that, among magenta dyes employed for ink-jet recording, a magenta dye providing vivid color and having a hue suitable for obtaining a wide range of colors by color mixing has a low level of light fastness and active gas resistance. Conversely, a magenta dye with excellent light fastness and active gas resistance has a hue insufficient to obtain a wide range of colors by color mixing and also has insufficient vividness. In addition to this, such a magenta dye is likely to cause problems when it contacts various members employed in an ink-jet recording apparatus, causing an impediment to long-term stable use of the ink-jet recording apparatus.

Generally, a phthalocyanine-based cyan dye employed for ink-jet recording is characterized by having light fastness superior to that of the magenta and yellow dyes but is likely to cause problems due to the solubility of the dye. For example, incomplete dissolution often occurs during manufacture of the cyan ink, causing manufacturing problems. Furthermore, insoluble materials often precipitate during storage or use of the cyan ink product, causing various problems. In particular, in the ink-jet recording described above, clogging of nozzles of an ink-jet head or ejection failure occurring due to precipitation of dye causes significant deterioration of the printed image or other problems. Furthermore, color fading due to active gases such as ozone is likely to occur, and thus a serious problem exists in that printing density is significantly decreased.

SUMMARY OF THE INVENTION

It is an object of the present invention to provide an ink set for ink-jet recording comprising a yellow ink, a magenta ink and a cyan ink. This ink set for ink-jet recording may have the following advantages: (1) Storage stability is excellent, whereby sufficient ejection stability is maintained over long-term use. (2) Color developing properties and vividness are well balanced among the inks. (3) A recorded material recorded with the inks has sufficiently excellent light fastness and ozone resistance. (4) The color fading properties of the inks are well balanced.

The present inventors have found that, when two specific types of dyes are employed as a yellow coloring agent for a yellow ink, this yellow ink provides a yellow color closer to a standard yellow color and can exhibit sufficient color developing properties while vividness, excellent light fastness and excellent ozone resistance are maintained. Furthermore, the inventors have prepared a magenta ink for ink-jet recording using two types of magenta dyes. In particular, a specific pyrazolylazopyridine-based (or pyrazolylazopyrazine-based) dye which has poor color developing properties and ejection stability but has excellent light fastness and ozone resistance has been used together with another specific dye which, conversely, has poor light fastness and ozone resistance but has excellent color developing properties and ejection stability. In this case, the inventors have found that the favorable characteristics of the two types of magenta dyes are not lost and that the level of these characteristics is not given by the arithmetic mean thereof. Rather, the inventors have unexpectedly found that these favorable characteristics are maintained. Moreover, the inventors have prepared a cyan ink for ink-jet recording using two types of cyan dyes. In particular, a specific copper phthalocyanine-based dye which exhibits excellent ozone resistance but has poor solubility in water and insufficient color developing properties has been used together with another specific copper phthalocyanine-based dye which has excellent solubility in water and excellent color developing properties but exhibits poor ozone resistance. In this case, the inventors have found that the favorable characteristics of the two types of cyan dyes are not lost and that the level of these characteristics is not given by the arithmetic mean thereof. Rather, the inventors have unexpectedly found that these favorable characteristics are maintained. Thus, the present invention has been completed.

Accordingly, the present invention provides an ink set for ink-jet recording, comprising a yellow ink containing a yellow coloring agent, water and a water soluble organic solvent, a magenta ink containing a magenta coloring agent, water and a water soluble organic solvent, and a cyan ink containing a cyan coloring agent, water and a water soluble organic solvent, wherein the yellow ink contains, as the yellow coloring agent, C. I. Direct Yellow 132 and C. I. Direct Yellow 86, wherein the magenta ink contains, as the magenta coloring agent, a magenta dye (1) and at least one dye selected from the group consisting of a magenta dye (2), C. I. Acid Red 52 and C. I. Acid Red 289, the magenta dye (1) being represented by the general formula (1):

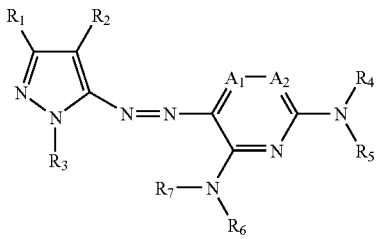
(1)

wherein $R_1$ represents a hydrogen atom, an optionally substituted alkyl group or an optionally substituted aryl group; $R_2$ represents a hydrogen atom, a halogen atom or a cyano group; $R_3$ represents a hydrogen atom, an optionally substituted alkyl group, an optionally substituted aryl group or an optionally substituted heterocyclic group; $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, provided that $R_4$ and $R_5$ are not simultaneously hydrogen atoms and that $R_6$ and $R_7$ are not simultaneously hydrogen atoms; and $A_1$ and $A_2$ are both optionally substituted carbon atoms, or one of $A_1$ and $A_2$ is an optionally substituted carbon atom and the other is a nitrogen atom, the magenta dye (2) being represented by the general formula (2) in a free acid form:

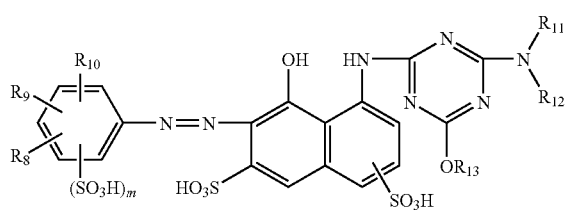
(2)

wherein $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group; m represents a number of 0, 1 or 2; and $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group, and wherein the cyan ink contains, as the cyan coloring agent, a cyan dye (1) represented by the general formula (3) and at least one dye selected from the group consisting of a cyan dye (2) represented by the general formula (4), a cyan dye (3) represented by the general formula (5) and C. I. Direct Blue 86:

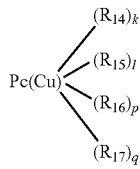
(3)

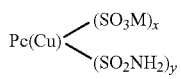
(4)

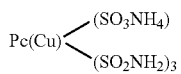
(5)

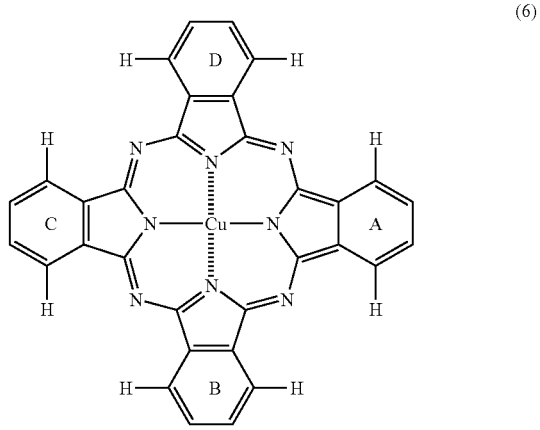
(6)

wherein, in the general formulas (3) to (5), Pc(Cu) represents a copper phthalocyanine nucleus represented by the general formula (6), wherein, in the general formula (3), k is a number satisfying $0<k<8$; l is a number satisfying $0<l<8$; p is a number satisfying $0 \leq p<8$; q is a number satisfying $0 \leq q<8$; k, l, p and q satisfy $4 \leq k+l+p+q \leq 8$; and $R_{14}$, $R_{15}$, $R_{16}$ and $R_{17}$ each independently represent a substituent selected from —$SO_2$—$R_a$, —$SO_2NR_bR_c$ and —$CO_2$—$R_a$, provided that $R_{14}$, $R_{15}$, $R_{16}$ and $R_{17}$ are not simultaneously the same, that at least one of $R_{14}$, $R_{15}$, $R_{16}$ and $R_{17}$ has an ionic hydrophilic group as a substituent, and that at least one or more of $R_{14}$, $R_{15}$, $R_{16}$ and $R_{17}$ is present on each of four benzene rings A, B, C and D of the copper phthalocyanine nucleus represented by general formula (6), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, wherein, in the general formula (4), each of an $SO_3M$ group and an $SO_2NH_2$ group is present on any of the four benzene rings A, B, C and D of the copper phthalocyanine nucleus represented by the general formula (6); M represents a monovalent metal cation selected from a lithium ion, a sodium ion and a potassium ion; x is a number satisfying $0<x<4$; y is a number satisfying $0<y<4$; and x and y satisfy $2 \leq x+y \leq 5$, and wherein, in the general formula (5), each of an $SO_3NH_4$ group and an $SO_2NH_2$ group is present on any of the four benzene rings A, B, C and D of the copper phthalocyanine nucleus represented by the general formula (6).

In the yellow ink of the ink set for ink-jet recording of the present invention, two specific types of dyes are employed as a yellow coloring agent. Therefore, the ink provides a yellow color closer to a standard yellow color and can exhibit sufficient color developing properties while vividness, excellent light fastness and excellent ozone resistance are maintained. Furthermore, in the magenta ink of the ink set for ink-jet recording of the present invention, two types of magenta dyes are employed. In particular, a specific pyrazolylazopyridine-based (or pyrazolylazopyrazine-based) dye which has poor color developing properties and ejection stability but has excellent light fastness and ozone resistance is used together with another specific dye which, conversely, has poor light fastness and ozone resistance but has excellent color developing properties and ejection stability. Therefore, the favorable characteristics of the two types of magenta dyes are not deteriorated and are thus maintained. Moreover, in the cyan ink of the ink set for ink-jet recording of the present invention, two types of cyan dyes are employed. In particular, a specific copper phthalocyanine-based dye which exhibits excellent light fastness and ozone resistance but has poor solubility in water and insufficient color developing properties is used together with another specific copper phthalocyanine-based dye which has excellent solubility in water, excellent color developing properties and light fastness but exhibits poor ozone resistance. Therefore, the favorable characteristics of the two types of cyan dyes are maintained. Accordingly, the ink set for ink-jet recording of the present invention has the following advantages: (1) Storage stability is excellent, whereby sufficient ejection stability is maintained over long-term use. (2) Color developing properties and vividness are well balanced among the inks. (3) A recorded material recorded with the inks has sufficiently excellent light fastness and ozone resistance. (4) The color fading properties of the inks are well balanced.

DETAILED DESCRIPTION OF THE PREFERRED EMBODIMENTS

The ink set for ink-jet recording of the present invention includes a yellow ink, a magenta ink and a cyan ink. Each of the inks contains, in addition to at least one corresponding coloring agent, at least water and a water soluble organic solvent.

The yellow ink employed in the present invention contains, as the yellow coloring agent, C. I. Direct Yellow 132 and C. I. Direct Yellow 86. Each of these coloring agents alone has sufficient vividness, excellent light fastness and excellent ozone resistance. Furthermore, when these coloring agents are mixed, they provide a yellow color closer to a standard yellow color and can exhibit sufficient color developing properties while their vividness, excellent light fastness and excellent ozone resistance are maintained.

Furthermore, the magenta ink employed in the present invention contains, as the magenta coloring agent, the magenta dye (1) represented by the above-described general formula (1) and also at least one dye selected from the group consisting of the magenta dye (2) represented by the general formula (2) in a free acid form, C. I. Acid Red 52 and C. I. Acid Red 289.

The magenta dye (1) represented by the general formula (1) has excellent light fastness and ozone resistance. However, conversely, the magenta dye (1) has drawbacks, i.e., poor color developing properties and low vividness. Thus, when the magenta dye (1) alone is employed as the magenta coloring agent of the magenta ink, it is difficult to ensure a sufficient color reproduction range and to form a vivid color image. Furthermore, the magenta dye (1) is likely to cause problems when it contacts with some members employed in an ink-jet recording apparatus. For example, the magenta dye (1) is more likely to attack a metal part, a piezoelectric element, a water repellent film which constitutes an ink-jet head, an adhesive which bonds the above components together, and the like. Therefore, it is likely that problems of reduction in water repellency of the water repellent film, corrosion in an ink passage, adhesion of foreign substances to nozzles, and the like will arise. The adverse effects of the magenta dye (1) on various materials of the ink-jet recording apparatus may cause not only a reduction in continuous ejection stability but also a reduction in long-term ejection stability. Furthermore, when the magenta ink contains a relatively large amount of the magenta dye (1), it is feared that the frequency of occurrence of bubbles will increase in the ink-jet head and in the ink passage connected to the ink-jet head. Therefore, given these concerns, there is a fear of a reduction in ejection stability.

Conversely, the magenta dye (2) represented by the general formula (2) in a free acid form, C. I. Acid Red 52 and C. I. Acid Red 289 exhibit poor light fastness and ozone resistance but have excellent vividness and color developing properties, in contrast to the magenta dye (1). In addition to this, the magenta dye (2), C. I. Acid Red 52 and C. I. Acid Red 289 have low attacking properties on various members employed in an ink-jet recording apparatus, and instead function to reduce the likelihood of the magenta ink attacking some of the members of the ink-jet recording apparatus (for example, on rubber members such as a rubber cap and wiper rubber).

Generally, when two types of dyes having different characteristics are employed together, it is conceivable that the favorable characteristics of the dyes are lost, or that the level of these favorable characteristics is given by the arithmetic mean thereof even when these characteristics are not lost. However, when the magenta dye (1) is employed together with at least one dye selected from the group consisting of the magenta dye (2), C. I. Acid Red 52 and C. I. Acid Red 289, the advantage is unexpectedly obtained that the favorable characteristics of each of the dyes are maintained.

Moreover, the cyan ink employed in the present invention contains, as the cyan coloring agent, the cyan dye (1) represented by the above-described general formula (3) and also at least one dye selected from the group consisting of the cyan dye (2) represented by the general formula (4), the cyan dye (3) represented by the general formula (5) and C. I. Direct Blue 86.

The cyan dye (1) represented by the general formula (3) is characterized in that stability when exposed to light and ozone is excellent since degree of association of the phthalocyanine compound is promoted. Conversely, since the degree of association of the phthalocyanine compound is large, the cyan dye (1) has a drawback in that its solubility in water are poor. Since the solubility in water are poor, there is a concern about the long-term storage stability and evaporativity of the ink. In particular, it is feared that, if a dye having poor solubility in water is employed in an ink, the viscosity of this ink is increased even when a small amount of water is evaporated. When the viscosity of the ink is too high, passage resistance in an ink-jet head is increased, and thus a difficulty arises in that the ink is not stably ejected. Furthermore, when a precipitate is formed, a difficulty arises in that the ink is not stably ejected since, for example, the precipitate may cause the occurrence of clogging of the nozzles and may adhere to the surface of the nozzles to cause misdirection of the ink.

When the amount of the dye is decreased to solve the evaporation problem, another problem arises in that the color developing properties deteriorate.

Conversely, the cyan dye (2) represented by the general formula (4), the cyan dye (3) represented by the general formula (5) and C. I. Direct Blue 86 have excellent color developing properties and light fastness and have a high degree of vividness. In addition to this, the cyan dye (2) represented by the general formula (4), the cyan dye (3) represented by the general formula (5) and C. I. Direct Blue 86 have good solubility in water but have a drawback in that their ozone resistance is poor.

Generally, when two types of dyes having different characteristics are employed together, it is conceivable that the favorable characteristics of the dyes are lost, or that the level of these favorable characteristics is given by the arithmetic mean thereof even when these characteristics are not lost, as has been described for the magenta dyes. However, when the cyan ink (1) is employed together with at least one dye selected from the group consisting of the cyan dye (2), the cyan dye (3) and C. I. Direct Blue 86, the advantage is unexpectedly obtained that the favorable characteristics of each of the dyes are maintained.

A description is given of the ratio between the essential coloring agents in the coloring agent of each of the inks in the present invention. In the yellow ink, the yellow coloring agent contains C. I. Direct Yellow 132 and C. I. Direct Yellow 86 in a ratio by weight of usually about 70:30 to about 90:10 and often about 80:20 to about 90:10. In the magenta ink, the magenta coloring agent contains the magenta dye (1) and at least one dye selected from the group consisting of the magenta dye (2), C. I. Acid Red 52 and C. I. Acid Red 289 in a ratio by weight of usually about 70:30 to about 90:10 and often about 80:20 to about 90:10. In the cyan ink, the cyan coloring agent contains the cyan dye (1) and at least one dye selected from the group consisting of the cyan dye (2), the cyan dye (3) and C. I. Direct Blue 86 in a ratio by weight of usually about 70:30 to about 95:5 and often about 85:15 to about 95:5. When the ratio between the amounts of the two essential coloring agents of each of the inks falls within the above ranges, a well-balanced ink set can be provided. In particular, each of the dyes has some of the following favorable characteristics: a sufficiently vivid image having excellent color developing properties is provided; toughnesses properties such as light fastness, ozone resistance and water resistance are excellent; and satisfactory ejection stability is maintained over long-term use. The ink set fully takes advantages of the above favorable characteristics of each of the dyes.

In the present invention, the amount of the coloring agent in each of the inks is appropriately determined depending on the performance and required characteristics of the ink. For the yellow ink, the amount of the yellow coloring agent based on the total weight of the yellow ink is usually about 1 wt % to about 5 wt % and often about 1 wt % to about 4 wt %. For the magenta ink, the amount of the magenta coloring agent based on the total weight of the magenta ink is usually about 1 wt % to about 5 wt % and often about 1 wt % to about 4 wt %. Furthermore, for the cyan ink, the amount of the cyan coloring agent based on the total weight of the cyan ink is usually about 1 wt % to about 5 wt % and often about 2 wt % to about 5 wt %. When the amount of the coloring agent in each of the inks falls within the above ranges, the favorable characteristics of each of the dyes can be fully utilized in a well-balanced manner. Furthermore, in the coloring agent of each of the inks, any other dyes may also be employed within the range which does not impair the effect of the invention.

The substituents in the general formula of each of the magenta dyes (1) and (2) will now be described. First, a description will be given of the substituents $R_1$ to $R_7$, $A_1$ and $A_2$ in the general formula (1) of the magenta dye (1).

As described above, $R_1$ represents a hydrogen atom, an optionally substituted alkyl group or an optionally substituted aryl group. $R_2$ represents a hydrogen atom, a halogen atom or a cyano group. $R_3$ represents a hydrogen atom, an optionally substituted alkyl group, an optionally substituted aryl group or an optionally substituted heterocyclic group. $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group. Here, $R_4$ and $R_5$ are not simultaneously hydrogen atoms, and $R_6$ and $R_7$ are not simultaneously hydrogen atoms. Furthermore, $A_1$ and $A_2$ are both optionally substituted carbon atoms, or one of $A_1$ and $A_2$ is an optionally substituted carbon atom and the other is a nitrogen atom.

Examples of the halogen atom in the general formula (1) include, but not limited to, a fluorine atom, a chlorine atom, a bromine atom and the like.

In the general formula (1), the alkyl group in the optionally substituted alkyl group is preferably an alkyl group having 1 to 6 carbon atoms, and examples of the substituent thereof include, but not limited to, a hydroxyl group, an alkoxy group (such as a methoxy group, an ethoxy group and the like), a cyano group, a halogen atom (such as a fluorine atom, a chlorine atom, a bromine atom and the like) and an ionic hydrophilic group (such as a carboxylate, a sulfonate and the like). Specific examples of the optionally substituted alkyl group include, but not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like.

In the general formula (1), the aryl group in the optionally substituted aryl group is preferably an aryl group having 6 to 12 carbon atoms excluding the carbon atoms of the substituent thereof. Examples of the substituent include, but not limited to, an alkyl group (such as a methyl group, an ethyl group, an isopropyl group, a tert-butyl group, an n-octyl group and the like), an alkoxy group (see above), a halogen atom (see above), an alkylamino group (such as a methylamino group, a dimethylamino group and the like), an amide group, a carbamoyl group, a sulfamoyl group, a sulfonamide group, a hydroxyl group, an ester group (such as a methoxycarbonyl group, an ethoxycarbonyl group and the like) and an ionic hydrophilic group (see above). Specific examples of the optionally substituted aryl group include, but not limited to, a phenyl group, a naphthyl group, a p-tolyl group, a p-octylphenyl group, a mesityl group, a p-methoxyphenyl group, an o-chlorophenyl group, an m-(3-sulfopropylamino)phenyl group and the like.

In the general formula (1), the heterocyclic group in the optionally substituted heterocyclic group is preferably a heterocyclic group having a 5- or 6-membered ring. Examples of the substituent of the heterocyclic group include, but not limited to, an amide group, a carbamoyl group, a sulfamoyl group, a sulfonamide group, a hydroxyl group, an ester group (see above) and an ionic hydrophilic group (see above). Specific examples of the optionally substituted heterocyclic group include, but not limited to, a 2-pyridyl group, a 2-thienyl group, a 2-thiazolyl group, a 2-benzothiazolyl group, a 2-furyl group, a 6-sulfobenzothiazolyl group, a 6-sulfonate substituted benzothiazolyl group and the like.

In the general formula (1), examples of the substituent of the optionally substituted sulfonyl group include, but not limited to, an alkyl group (see above), an aryl group (see above) and the like. Specific examples of the optionally substituted sulfonyl group include, but not limited to, a methylsulfonyl group, a phenylsulfonyl group and the like.

In the general formula (1), examples of the acyl group in the optionally substituted acyl group include an acyl group having 1 to 12 carbon atoms excluding the carbon atoms of the substituent thereof. Examples of the substituent include, but not limited to, an ionic hydrophilic group (see above). Specific examples of the optionally substituted acyl group include, but not limited to, an acetyl group, a benzoyl group, a chloroacetyl group and the like.

As has been described, in the general formula (1), $A_1$ and $A_2$ are both optionally substituted carbon atoms, or one of $A_1$ and $A_2$ is an optionally substituted carbon atom and the other is a nitrogen atom. Preferably, $A_1$ and $A_2$ are both optionally substituted carbon atoms because better performance can be obtained. Examples of the substituent bonded to the carbon atoms $A_1$ and $A_2$ include, but not limited to, an alkyl group having 1 to 3 carbon atoms, a carboxyl group, a carbamoyl group, a cyano group and the like.

Furthermore, in the general formula (1), $R_4$ and $R_5$ are not simultaneously hydrogen atoms, and also $R_6$ and $R_7$ are not simultaneously hydrogen atoms. Moreover, when the number of sulfonic acid groups and carboxyl groups as the substituents is large, the water solubility of the magenta dye (1) tends to be improved. Therefore, it is preferable that the number of these substituents be adjusted in accordance with need.

One embodiment of the magenta dye (1) is a magenta dye represented by the general formula (1), wherein $R_1$ is an alkyl group; $R_2$ is a cyano group; $R_3$ is a hydrogen atom or an optionally substituted heterocyclic group; $R_4$ is a hydrogen atom, an optionally substituted heterocyclic group or a substituted aryl group; $R_5$ and $R_6$ are each independently a substituted heterocyclic group or a substituted aryl group; $R_7$ is a hydrogen atom; $A_1$ is a substituted carbon atom; and $A_2$ is an optionally substituted carbon atom.

A further embodiment of the magenta dye (1) is a magenta dye represented by the general formula (1), wherein $R_1$ is a tert-butyl group; $R_2$ is a cyano group; $R_3$ is a hydrogen atom or a benzothiazolyl group (preferably a benzothiazole-2-yl group) optionally substituted by a sulfonic acid group or an alkali metal sulfonate group; $R_4$ is a hydrogen atom, a benzothiazolyl group (preferably a benzothiazole-2-yl group) optionally substituted by a sulfonic acid group or an alkali metal sulfonate group or a trialkylphenyl group (preferably a mesityl group) substituted by a sulfonic acid group or an alkali metal sulfonate group; $R_5$ and $R_6$ are each independently a monoalkylphenyl, or trialkylphenyl group (preferably a p-octylphenyl or mesityl group) optionally substituted by a sulfonic acid group or an alkali metal sulfonate group, or a benzothiazolyl group (preferably a benzothiazole-2-yl group) substituted by a sulfonic acid group or an alkali metal sulfonate group; $R_7$ is a hydrogen atom; $A_1$ is a carbon atom substituted by an alkyl group (preferably a methyl group); and $A_2$ is a carbon atom optionally substituted by a cyano group.

Specific examples of the magenta dye (1) include, but not limited to, compounds represented by chemical formulas (1-A) to (1-E) below.

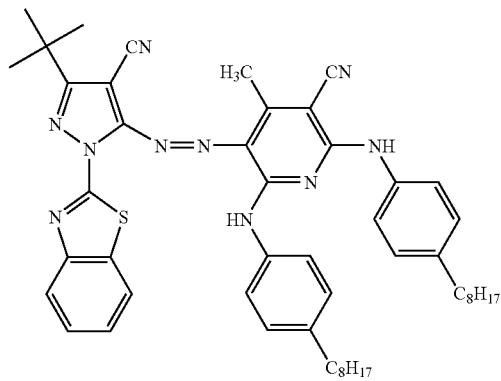

(1-A)

The compound represented by chemical formula (1-A) is an embodiment of the magenta dye (1), wherein, in the general formula (1), $R_1$ is a tert-butyl group; $R_2$ is a cyano group; $R_3$ is a benzothiazole-2-yl group; $R_4$ is a hydrogen atom; $R_5$ and $R_6$ are each a p-octylphenyl group; $R_7$ is a hydrogen atom; $A_1$ is a carbon atom substituted by a methyl group; and $A_2$ is a carbon atom substituted by a cyano group.

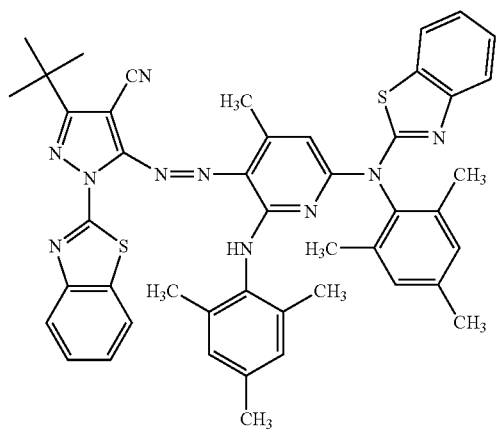

(1-B)

The compound represented by chemical formula (1-B) is another embodiment of the magenta dye (1), wherein, in the general formula (1), $R_1$ is a tert-butyl group; $R_2$ is a cyano group; $R_3$ and $R_4$ are each a benzothiazole-2-yl group; $R_5$ and $R_6$ are each a mesityl group; $R_7$ is a hydrogen atom; $A_1$ is a carbon atom substituted by a methyl group; and $A_2$ is a carbon atom.

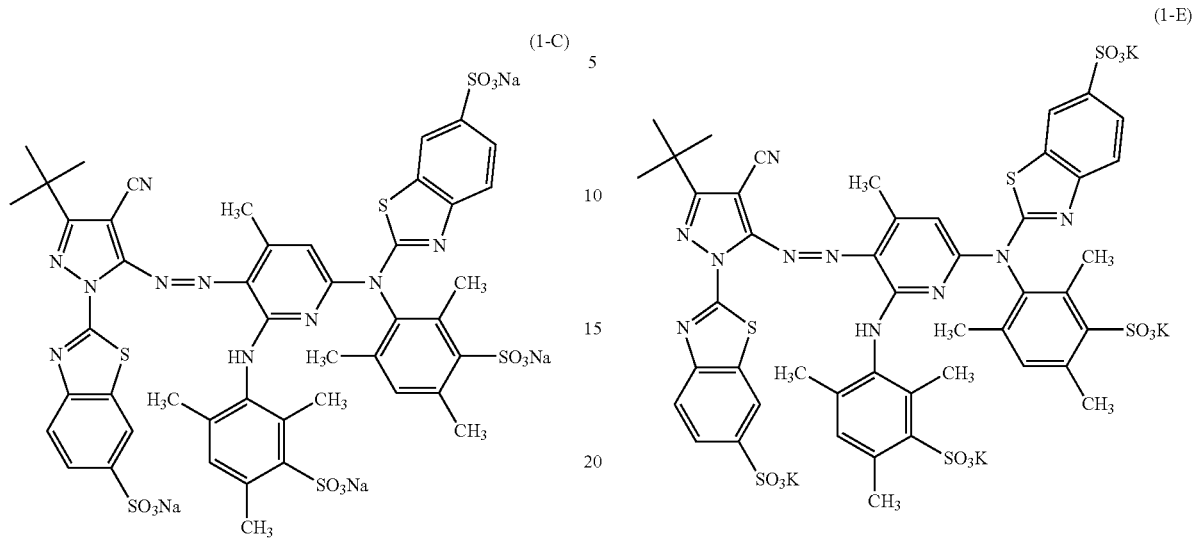

(1-C)

The compound represented by chemical formula (1-C) is yet another embodiment of the magenta dye (1), wherein, in the general formula (1), $R_1$ is a tert-butyl group; $R_2$ is a cyano group; $R_3$ and $R_4$ are each a 6-sodium sulfonate-substituted benzothiazole-2-yl group; $R_5$ and $R_6$ are each a 3-sodium sulfonate-substituted mesityl group; $R_7$ is a hydrogen atom; $A_1$ is a carbon atom substituted by a methyl group; and $A_2$ is a carbon atom.

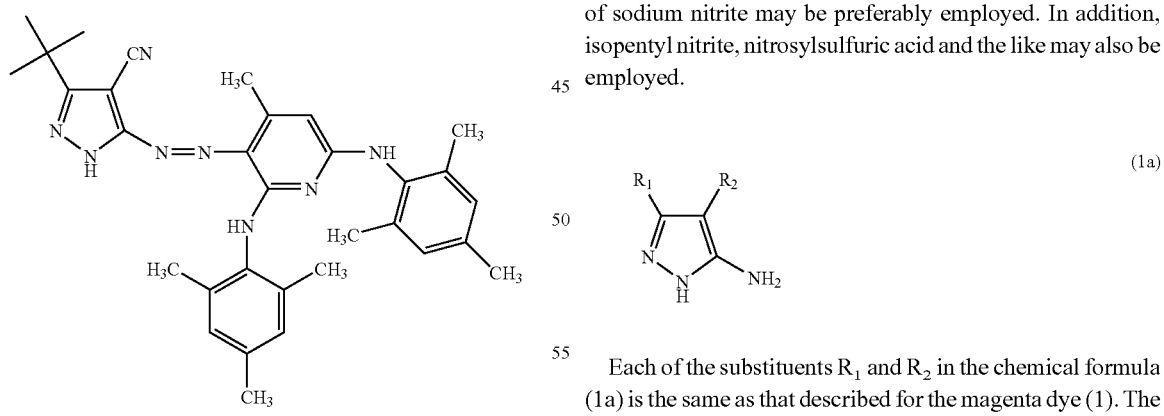

(1-D)

The compound represented by chemical formula (1-D) is another embodiment of the magenta dye (1), wherein, in the general formula (1), $R_1$ is a tert-butyl group; $R_2$ is a cyano group; $R_3$ and $R_4$ are each a hydrogen atom; $R_5$ and $R_6$ are each a mesityl group; $R_7$ is a hydrogen atom; $A_1$ is a carbon atom substituted by a methyl group; and $A_2$ is a carbon atom.

The compound represented by chemical formula (1-E) is yet another embodiment of the magenta dye (1), wherein, in the general formula (1), $R_1$ is a tert-butyl group; $R_2$ is a cyano group; $R_3$ and $R_4$ are each 6-potassium sulfonate-substituted benzothiazole-2-yl group; $R_5$ and $R_6$ are each a 3-potassium sulfonate-substituted mesityl group; $R_7$ is a hydrogen atom; $A_1$ is a carbon atom substituted by a methyl group; and $A_2$ is a carbon atom.

The magenta dye (1) represented by the general formula (1) can be produced by following steps (a) to (c) described below.

Step (a)

Aminopyrazole represented by the chemical formula (1a) is reacted with a diazotization agent to form a diazonium salt. As the diazotization agent, a dilute hydrochloric acid solution of sodium nitrite may be preferably employed. In addition, isopentyl nitrite, nitrosylsulfuric acid and the like may also be employed.

(1a)

Each of the substituents $R_1$ and $R_2$ in the chemical formula (1a) is the same as that described for the magenta dye (1). The aminopyrazole represented by the chemical formula (1a) can be synthesized according to a method described in U.S. Pat. No. 3,336,285; "Heterocycles", 20, 519, (1983); Japanese Patent Publication No. Hei 6-19036, or the like.

Step (b)

Next, the diazonium salt formed in step (a) is reacted with a coupling agent represented by the chemical formula (1b) to form a compound represented by the chemical formula (1c).

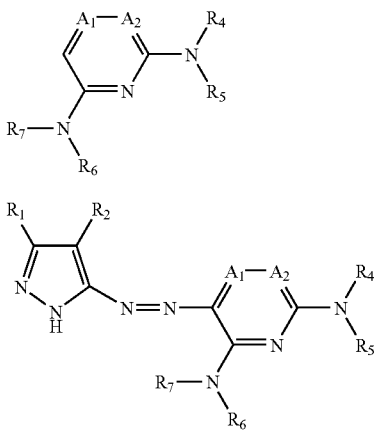

Each of the substituents $R_1$ to $R_7$ in the chemical formulas (1b) and (1) is the same as that described for the magenta dye (1). The pyridine-based coupling agent represented by chemical formula (1b) can be synthesized according to a method described in Japanese Patent Application Laid-Open No. Sho 51-83631, Japanese Patent Application Laid-Open No. Sho 49-74718, Japanese Patent Publication No. Sho 52-46230, or the like.

Step (c)

Subsequently, the compound formed in step (b) is reacted with an alkylating agent, an arylating agent or a heterylating agent in the presence of a base, thereby obtaining the magenta dye (1) represented by the general formula (1). As the base employed in this step, an organic base such as diisopropylethylamine and the like or an inorganic base such as potassium carbonate, sodium carbonate, sodium hydrogen carbonate, potassium hydrogen carbonate, sodium hydroxide, potassium hydroxide and the like may be employed. The alkylating agent is a compound represented by "R—X." Here, R is an optionally substituted alkyl group. Furthermore, X is a halogen atom or $OSO_2R'$, wherein R' is an alkyl group or an aryl group such as a phenyl group and the like. Moreover, the arylating agent is a compound represented by "Ar—X." In this instance, Ar is a phenyl group substituted by an electron-accepting group (preferably substituted by a substituent having a total Hammett's σp value of 0.2 or more). The heterylating agent is a compound represented by "Het-X." In this instance, Het is a hetero ring. Examples of the hetero ring include, but not limited to, a 2-pyridyl group, a 2-thienyl group, a 2-thiazolyl group, a 2-benzothiazolyl group, a triazyl group, a 2-furyl group and the like.

A description will now be given of the substituents $R_8$ to $R_{13}$ in the general formula (2) of the magenta dye (2). In this instance, examples of the substituent capable of bonding to each of the substituents $R_8$ to $R_{13}$ include, but not limited to, the substituents described for formula (1) of the magenta dye (1).

As described above, in the general formula (2), $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group. m represents a number 0, 1 or 2. $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group.

A description is given of the substituents represented by $R_8$, $R_9$ and $R_{10}$ in the general formula (2). Examples of the optionally substituted alkyl group include, but not limited to, an alkyl group having 1 to 9 carbon atoms in total. Specific examples of such an alkyl group include, but not limited to, a methyl group, an ethyl group, an n-propyl group, an isopropyl group, an n-butyl group, a trifluoromethyl group, a dimethylaminomethyl group and the like. Examples of the optionally substituted alkoxy group include, but not limited to, an alkoxy group having 1 to 9 carbon atoms in total. Specific examples of such an alkoxy group include, but not limited to, a methoxy group, an isopropoxy group, an n-butoxy group and the like. Specific examples of the halogen atom include, but not limited to, a fluorine atom, a chlorine atom, a bromine atom and the like. Specific examples of the optionally substituted carbamoyl group include, but not limited to, a carbamoyl group, an N,N-dimethylcarbamoyl group, a phenylcarbamoyl group and the like. Specific examples of the optionally substituted sulfamoyl group include, but not limited to, a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group and the like. Specific examples of the optionally substituted amino group include, but not limited to, an N-methylamino group, a carbamoylamino group, an N,N-diethylamino group, an acetylamino group and the like. Examples of the sulfonate group include, but not limited to, a phenoxysulfonyl group and the like. Examples of the optionally substituted alkylsulfonyl group include, but not limited to, an alkylsulfonyl group having 1 to 9 carbon atoms in total. Specific examples of such an alkylsulfonyl group include, but not limited to, a hydroxyethylsulfonyl group and the like. Examples of the optionally substituted arylsulfonyl group include, but not limited to, an arylsulfonyl group having 6 to 15 carbon atoms in total. Specific examples of such an arylsulfonyl group include, but not limited to, a benzylsulfonyl group and the like. Specific examples of the carboxylate group include, but not limited to, a methoxycarboxyl group and the like.

A description will be given of the substituents represented by $R_{11}$, $R_{12}$ and $R_{13}$ in the general formula (2). Examples of the optionally substituted alkyl group include, but not limited to, an alkyl group having 1 to 18 carbon atoms in total. Specific examples of such an alkyl group include, but not limited to, an ethyl group, an n-butyl group, an n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group and the like. Examples of the optionally substituted alkenyl group include, but not limited to, an alkenyl group having 2 to 18 carbon atoms in total. Specific examples of such an alkenyl group include, but not limited to, a 2-methyl-1-propenyl group, a vinyl group, an allyl group and the like. Specific examples of the optionally substituted aryl group include, but not limited to, a 3,4-dicarboxyphenyl group, a 4-butylphenyl group, a 4-carboxyphenyl group and the like. Specific examples of the optionally substituted aralkyl group include, but not limited to, a benzyl group, a 1-carboxy-2-phenyl-ethyl group, a 1-carboxy-2-hydroxyphenylethyl group, a 4-carboxybenzyl group and the like. Specific examples of the optionally substituted alicyclic group include, but not limited to, a cyclohexyl group, a 4-carboxycyclohexyl group and the like. Specific examples of the optionally substituted heterocyclic group include, but not limited to, a pyridyl group, a thiadiazolyl group, a benzothiazolyl group, a 2,2,6,6-tetramethylpiperidinyl group and the like. Furthermore, at least one of $R_{11}$, $R_{12}$ and $R_{13}$ may be an alkyl, alkenyl, aryl, alicyclic, aralkyl or heterocyclic group substituted by one to four carboxyl or sulfamoyl groups. Moreover, $R_{11}$ and $R_{12}$ may be each independently a hydrogen atom or a trisubstituted phenyl group. In this instance, the three substituents of the trisubstituted phenyl group are each independently a hydrogen atom, a halogen atom, a hydroxyl group, an optionally substituted alkyl group having 1 to 9 carbon atoms in total, an optionally substituted alkoxy group having 1 to 9 carbon atoms in total, an optionally substituted carbamoyl group, an optionally substituted sulfamoyl group, an optionally substituted amino group, a nitro group, a sulfonate group or a carboxylate group.

One embodiment of the magenta dye (2) is a magenta dye represented by the general formula (2), wherein at least one of $R_{11}$, $R_{12}$ and $R_{13}$ is an alkyl, alkenyl, aryl, aralkyl or cyclohexyl group substituted by one to four carboxyl or sulfamoyl groups.

Preferably, in the magenta dye (2) represented by the general formula (2), the total number of sulfonic acid, carboxyl, sulfonate and carboxylate groups contained in its structure is six or less, often five or less and more often four or less. Furthermore, the magenta dye (2) may be used in the free acid form. However, when the magenta dye (2) is obtained in a salt form during manufacturing, it may be used without conversion or may be converted into a desired salt form. Moreover, a part of the acid groups may be in a salt form, and both a salt-form dye and a free acid-form dye may be present. Examples of such a salt form include, but not limited to, salts of alkali metals such as Na, Li, K and the like, ammonium salts optionally substituted by an alkyl group or a hydroxyalkyl group, and salts of organic amines. Examples of the organic amines include, but not limited to, a lower alkylamine, a hydroxy-substituted lower alkylamine, a carboxy-substituted lower alkylamine, a polyamine having 2 to 10 alkyleneimine units each having 2 to 4 carbon atoms and the like. The number of the types of these salts used in not limited to 1, but a plurality of types of the salts may be present.

Another embodiment of the magenta dye (2) is a magenta dye represented by the general formula (2), wherein m is 0; $R_8$ is a carboxyl group, a carbamoyl group, a trifluoromethyl group or a sulfamoyl group; $R_9$ and $R_{10}$ are hydrogen atoms; $R_{11}$ is a carboxyalkyl group or a phenyl group optionally substituted by a carboxyl group or a sulfamoyl group; $R_{12}$ is a hydrogen atom; and $R_{13}$ is a hydrogen atom or an alkyl group.

Particularly, specific examples of the magenta dye (2) include, but not limited to, compounds represented by the chemical formulas (2-A) to (2-E) below.

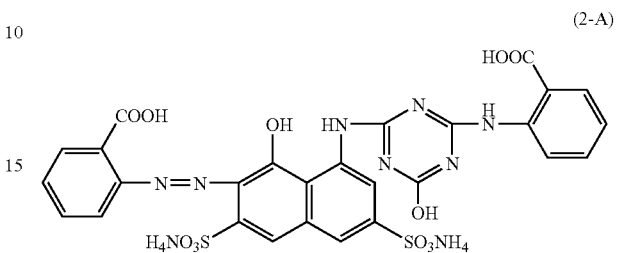

(2-A)

The compound represented by the chemical formula (2-A) is an embodiment of the magenta dye (2), wherein, in the general formula (2), m is 0; $R_8$ is a carboxyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom.

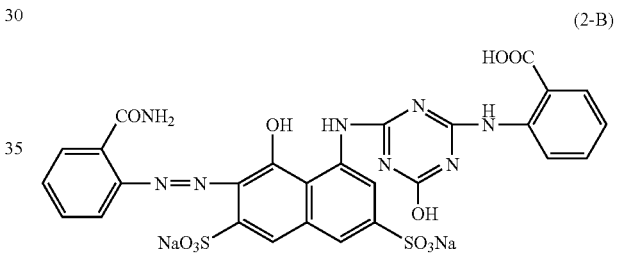

(2-B)

The compound represented by the chemical formula (2-B) is another embodiment of the magenta dye (2), wherein, in the general formula (2), m is 0; $R_8$ is a carbamoyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom.

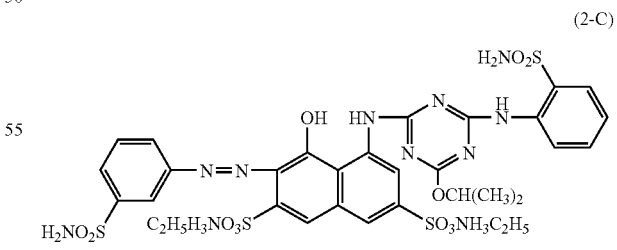

(2-C)

The compound represented by the chemical formula (2-C) is yet another embodiment of the magenta dye (2), wherein, in the general formula (2), m is 0; $R_8$ is a sulfamoyl group at the 3-position of the phenyl group bonded to the azo group; $R_9$, $R_{10}$ and $R_{12}$ are hydrogen atoms; $R_{11}$ is a 2-sulfamoylphenyl group; and $R_{13}$ is an isopropyl group.

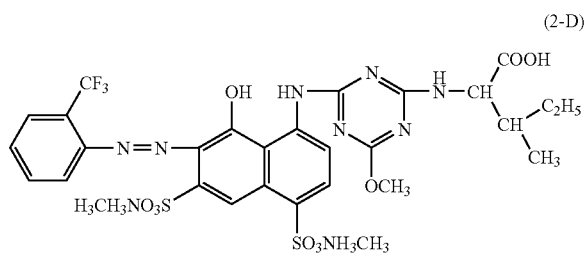
(2-D)

The compound represented by the chemical formula (2-D) is another embodiment of the magenta dye (2), wherein, in the general formula (2), m is 0; $R_8$ is a trifluoromethyl group at the 2-position of the phenyl group bonded to the azo group; $R_9$, $R_{10}$ and $R_{12}$ are hydrogen atoms; $R_{11}$ is a 1-carboxy-2-methylbutyl group; and $R_{13}$ is a methyl group.

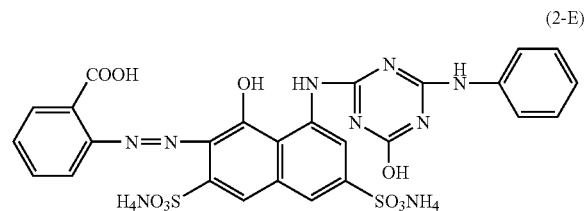
(2-E)

The compound represented by the chemical formula (2-E) is an embodiment of the magenta dye (2), wherein, in the general formula (2), m is 0; $R_8$ is a carboxyl group at the 2-position of the phenyl group bonded to the azo group; $R_9$, $R_{10}$ and $R_{12}$ are hydrogen atoms; $R_{11}$ is a phenyl group; and $R_{13}$ is a hydrogen atom.

The magenta dye (2) represented by the general formula (2) can be produced by a known method. For example, the magenta dye (2) can be produced by the following steps (A) to (C) described below.

Step (A)

First, a monoazo compound is produced from 2-aminobenzoic acid (anthranilic acid) and 1-amino-8-hydroxy-3,6-naphthalenedisulfonic acid (H acid) by a routine method (see, for example, pp. 396 to 409 of "SHIN SENRYO KAGAKU (New Dye Chemistry)", written by Yutaka Hosoda, published by Gihodo, Dec. 21, 1973) through diazotization and coupling reaction.

Step (B)

The obtained monoazo compound is added to a cyanuric chloride suspension and allowed to react for several hours. At this time, the reaction mixture is maintained at a pH of 4 to 6 and a temperature of 0° C. to 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to condensation reaction for several hours. Subsequently, 25% aqueous solution of sodium hydroxide is added to the reaction mixture at 50° C. to 60° C. to make the reaction mixture strong alkaline, thereby effecting a hydrolysis reaction. Thus, the reaction is completed.

Step (C)

After the reaction, the reaction mixture is cooled and is subjected to salting out with sodium chloride, thereby obtaining the magenta dye (2).

As C. I. Acid Red 52 and C. I. Acid Red 289 which can be employed as the magenta coloring agent for the magenta ink of the present invention, a commercial product may be employed. Here, C. I. Acid Red 52 and C. I. Acid Red 289 are dyes represented by, for example, the following chemical structural formulas.

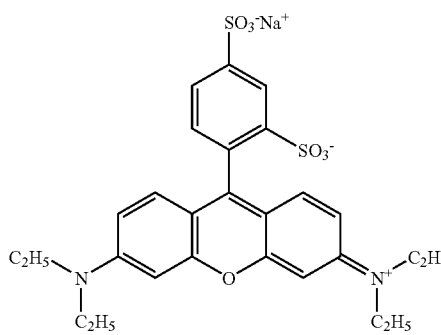
C.I. Acid Red 52

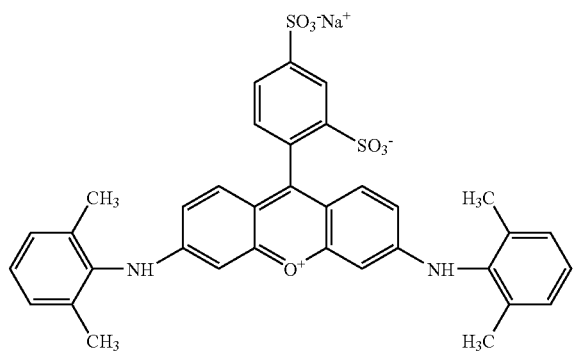
C.I. Acid Red 289

The substituents in the general formula of each of the cyan dyes (1) and (2) will now be described. First, a description will be given of substituents $R_{14}$ to $R_{17}$, Pc(Cu), k, l, p and q in the general formula (3) of the cyan dye (1).

As described above, Pc(Cu) represents the copper phthalocyanine nucleus represented by the general formula (6). $R_{14}$, $R_{15}$, $R_{16}$ and $R_{17}$ each independently represent a substituent selected from $-SO_2-R_a$, $-SO_2NR_bR_c$ and $-CO_2-R_a$, provided that $R_{14}$, $R_{15}$, $R_{16}$ and $R_{17}$ are not simultaneously the same. Here, at least one of $R_{14}$, $R_{15}$, $R_{16}$ and $R_{17}$ has an ionic hydrophilic group as a substituent. Furthermore, at least one or more of $R_{14}$, $R_{15}$, $R_{16}$ and $R_{17}$ is present on each of the four benzene rings A, B, C and D of the copper phthalocyanine nucleus represented by the general formula (6). $R_a$ represents a substituted or unsubstituted alkyl group. $R_b$ represents a hydrogen atom, or a substituted or unsubstituted alkyl group. Furthermore, $R_c$ represents a substituted or unsubstituted alkyl group. k is a number satisfying $0<k<8$, and l is a number satisfying $0<l<8$. p is a number satisfying $0\leq p<8$, and q is a number satisfying $0\leq q<8$. In addition, k, l, p and q satisfy $4\leq k+l+p+q\leq 8$.

Examples of the substituted or unsubstituted alkyl groups $R_a$, $R_b$ and $R_c$ in the general formula (3) include, but not limited to, linear, branched and alicyclic alkyl groups having 1 to 12 carbon atoms. Particularly, a branched alkyl group is preferable because the solubility of the dye and the stability of the ink are improved. Particularly preferably, the alkyl group has an asymmetric carbon atom (in this case a racemic body is used).

Examples of the substituent of the substituted alkyl groups $R_a$, $R_b$ and $R_c$ include, but not limited to, a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms (among the above groups, branched chain groups are preferable in terms of improving the solubility of the dye and the stability of the ink, and groups having an asymmetric carbon atom are particularly preferable. Examples of such groups include, but not limited to, methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (for example, a chlorine atom or a bromine atom), an aryl group (for example, phenyl, 4-tert-butylphenyl or 2,4-di-tert-amylphenyl), a heterocyclic group (for example, imidazolyl, pyrazolyl, triazolyl, 2-furil, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methanesulfonylethoxy), an aryloxy group (for example, phenoxy, 2-methylphenoxy, 4-tert-butylphenoxy, 3-nitrophenoxy, 3-tert-butyloxycarbamoylphenoxy or 3-methoxycarbamoyl), an acylamino group (for example, acetamide, benzamide or 4-(3-tert-butyl-4-hydroxyphenoxy) butaneamide), an alkylamino group (for example, methylamino, butylamino, diethylamino or methylbutylamino), an anilino group (for example, phenylamino or 2-chloroanilino), a ureide group (for example, phenylureide, methylureide or N,N-dibutylureide), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-tert-octylphenylthio or 2-carboxyphenylthio), an alkyloxycarbonylamino group (for example, methoxycarbonylamino), a sulfonamide group (for example, methanesulfonamide, benzenesulfonamide or p-toluenesulfonamide), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methanesulfonyl, octanesulfonyl, benzenesulfonyl or toluenesulfonyl), an alkyloxycarbonyl group (for example, methoxycarbonyl or butyloxycarbonyl), a heterocyclic oxy group (for example, 1-phenyltetrazole-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy, N-phenylcarbamoyloxy), a silyloxy group (for example, trimethylsilyloxy or dibutylmethylsilyloxy), an aryloxycarbonylamino group (for example, phenoxycarbonylamino), an imide group (for example, N-succinimide or N-phthalimide), a heterocyclic thio group (for example, 2-benzothiazolylthio, 2,4-diphenoxy-1,3,5-triazole-6-thio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl) and an ionic hydrophilic group (for example, a carboxyl group, a sulfo group, a phosphono group or a quaternary ammonium group). Of these, a hydroxyl group, a group having an ether bond or an ester bond, a cyano group, a sulfoneamide group are particularly preferable because the association properties of the dye are enhanced to improve toughnesses. In addition to the above, the substituent of the substituted alkyl groups $R_a$, $R_b$ and $R_c$ may have a halogen atom or an ionic hydrophilic group.

Specific examples of the substituted or unsubstituted alkyl groups $R_a$, $R_b$ and $R_c$ include, but not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, 4-sulfobutyl group and the like.

One embodiment of the cyan dye (1) is a cyan dye represented by general formula (3), wherein $R_{14}$, $R_{15}$, $R_{16}$ and $R_{17}$ are substituents represented by —$SO_2$—$R_a$, wherein $R_a$ is a substituted or unsubstituted alkyl group, provided that not all the four substituted or unsubstituted alkyl groups $R_a$ in $R_{14}$, $R_{15}$, $R_{16}$ and $R_{17}$ are completely identical. Here, "not all the four groups $R_a$ being completely identical" means that, provided that at least one of the four groups $R_a$ is a substituted alkyl group having an ionic hydrophilic group, at least two types of $R_a$ are present.

A further embodiment of the cyan dye (1) is a cyan dye represented by the general formula (3), wherein k is a number satisfying $0<k<4$; l is a number satisfying $0<l<4$; p is a number satisfying $0\leq p<4$; q is a number satisfying $0\leq q<4$; and the sum of k, l, p and q is 4.

Specific examples of the cyan dye (1) include, but not limited to, compounds represented by the chemical formulas (3-A) to (3-E) below.

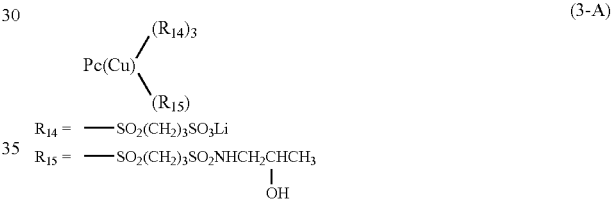

The compound represented by the chemical formula (3-A) is an embodiment of the cyan dye (1), wherein, in the general formula (3), $R_{14}$ is a lithium sulfonato propylsulfonyl group; $R_{15}$ is an N-(2-hydroxypropyl)sulfamoylpropylsulfonyl group; k is 3; l is 1; and both p and q are 0.

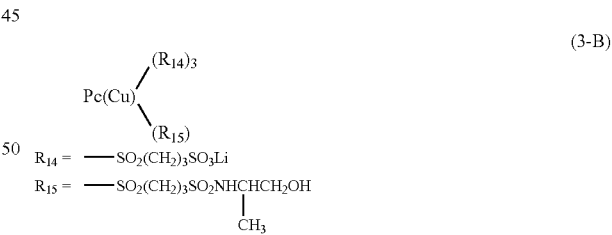

The compound represented by the chemical formula (3-B) is another embodiment of the cyan dye (1), wherein, in the general formula (3), $R_{14}$ is a lithium sulfonato propylsulfonyl group; $R_{15}$ is an N-(2-hydroxyisopropyl)sulfamoylpropylsulfonyl group; k is 3; l is 1; and both p and q are 0.

-continued $R_{14} = -SO_2(CH_2)_3SO_3Li$ $R_{15} = -SO_2(CH_2)_3SO_2N\begin{smallmatrix}C_2H_4OH\\C_2H_4OH\end{smallmatrix}$ The compound represented by the chemical formula (3-C) is yet another embodiment of the cyan dye (1), wherein, in the general formula (3), $R_{14}$ is a lithium sulfonato propylsulfonyl group; $R_{15}$ is an N,N-(di(2-hydroxyethyl))sulfamoylpropylsulfonyl group; k is 3; is 1; and both p and q are 0.

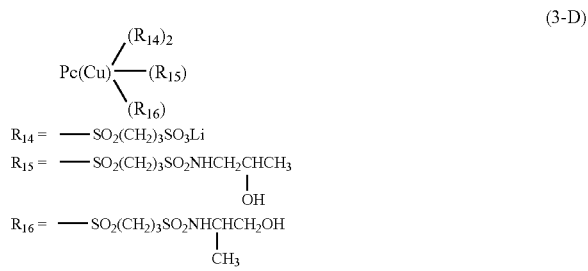

(3-D)

The compound represented by the chemical formula (3-D) is another embodiment of the cyan dye (1), wherein, in the general formula (3), $R_{14}$ is a lithium sulfonato propylsulfonyl group; $R_{15}$ is an N-(2-hydroxypropyl)sulfamoylpropylsulfonyl group; $R_{16}$ is an N-(2-hydroxyisopropyl)sulfamoylpropylsulfonyl group; k is 2; l is 1; p is 1; and q is 0.

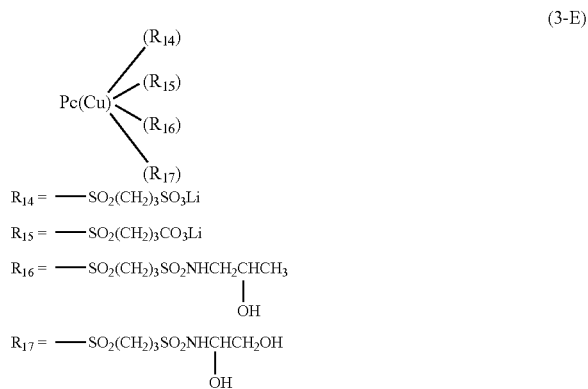

(3-E)

The compound represented by the chemical formula (3-E) is yet another embodiment of the cyan dye (1), wherein, in the general formula (3), $R_{14}$ is a lithium sulfonato propylsulfonyl group; $R_{15}$ is a lithium carboxylate propylsulfonyl group; $R_{16}$ is an N-(2-hydroxypropyl)sulfamoylpropylsulfonyl group; $R_{17}$ is an N-(2-hydroxyisopropyl)sulfamoylpropylsulfonyl group; and k, l, p and q are 1.

A production method of the cyan dye (1) represented by the general formula (3) will now be described below. Generally, when an unsubstituted phthalocyanine compound is sulfonated according to a method described in Published Japanese Translation of PCT International Application No. 2002-526589 (WO00/17275), a sulfo group can be relatively easily introduced into the phthalocyanine nucleus. When a sulfonated phthalocyanine compound is employed as a water soluble dye, a salt of the sulfo group is formed using an alkali metal hydroxide such as sodium hydroxide, and the obtained sulfonate can be used as a dye without further treatment. In this case, the sulfonation can occur at any position in the phthalocyanine nucleus, and it is difficult to control the number of introduced sulfo groups. Therefore, when sulfonation is carried out under reaction conditions in which the position and number of introduced sulfo groups are not taken into account and in which only the ease of sulfonation is taken into account, the position and number of the sulfo groups introduced into the product are difficult to identify. Thus, a mixture is obtained in which the number of substituents and the substitution positions are not uniform. Hence, in order to improve the ozone resistance of the cyan dye (1), any product having poor ozone resistance must be prevented from being mixed. Therefore, it is essential that a specific substituent be introduced into a phthalic acid derivative in advance to synthesize both the copper phthalocyanine from this substituted phthalic acid derivative and a copper derivative such as $CuCl_2$. A method for synthesizing copper phthalocyanine from a phthalic acid derivative and a copper derivative is described in Japanese Patent Application Laid-Open No. 2000-303009 and the like.

An example of the production method of the cyan dye (1) is described below. In this case, a substituted phthalic acid derivative can be produced by the following scheme detailed below.

As a phthalic acid derivative serving as a raw material, substituted phthalonitrile, substituted diaminoisoindoline, substituted phthalic acid diamide, substituted phthalimide, substituted phthalic acid and a salt thereof, substituted phthalic anhydride and the like may be employed.

The substituent of the substituted phthalic acid derivatives is a soluble group or a precursor thereof. The soluble group is a substituent which imparts solubility to a copper phthalocyanine dye. When a soluble group imparts water solubility to a copper phthalocyanine dye, the soluble group is a hydrophilic group. Examples of the hydrophilic group include, but not limited to, an ionic hydrophilic group and a substituent substituted by an ionic hydrophilic group. The precursor of a soluble group is a substituent which can be converted to a soluble group through a reaction after a phthalocyanine ring is formed. Preferably, the substituent of the substituted phthalic acid derivatives is a substituent selected from $—SO_2—R_a$, $—SO_2NR_bR_c$ and $—CO_2—R_a$. In this instance, $R_a$ represents a substituted or unsubstituted alkyl group, and $R_b$ represents a hydrogen atom or a substituted or unsubstituted alkyl group. Furthermore, $R_c$ represents a substituted or unsubstituted alkyl group.

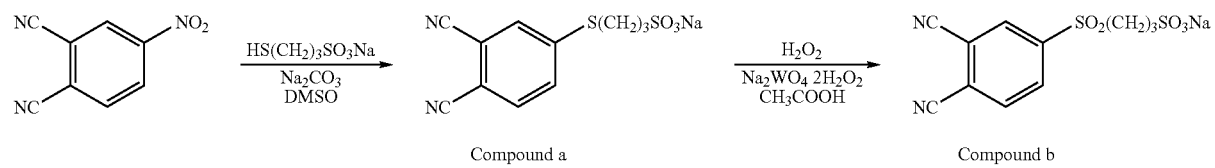

Compound a         Compound b

-continued

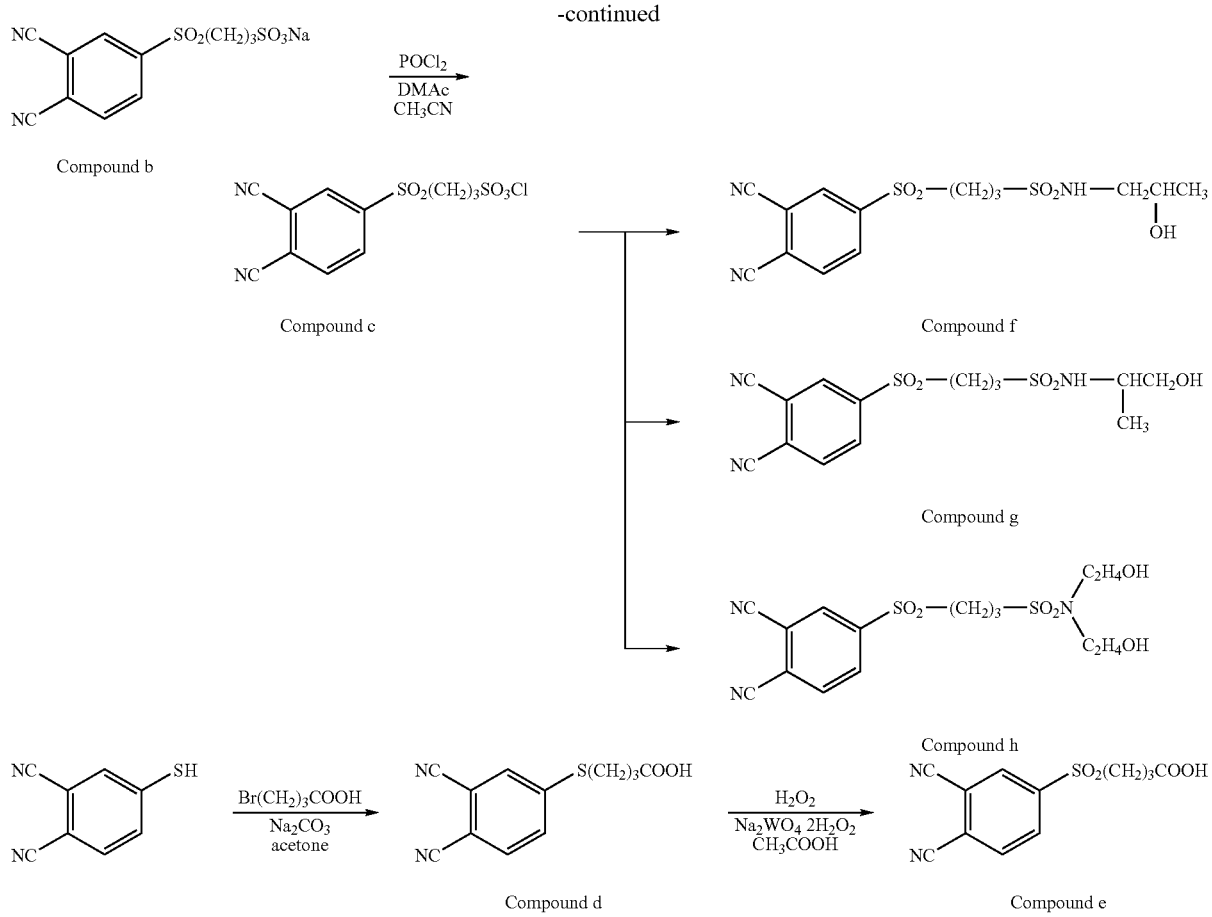

The phthalic acid derivatives are typified by compounds a to h. A phthalic acid derivative is mixed with a metal derivative such as $CuCl_2$ in a molar ratio (metal derivative:phthalic acid derivative) of 3:1 to 6:1. Then, the mixture is reacted at a temperature ranging from 80° C. to 300° C. in the presence of an organic solvent having a boiling point of 80° C. or higher and preferably 130° C. or higher. When the reaction temperature is lower than 80° C., the reaction rate may be significantly decreased. Conversely, when the reaction temperature exceeds 300° C., the phthalocyanine dye obtained may be decomposed. In this case, the reaction time is preferably 2 hours to 20 hours. When the reaction time is less than 2 hours, a large amount of the raw materials may remain unreacted. Conversely, when the reaction time exceeds 20 hours, the phthalocyanine dye obtained may be decomposed. This reaction may be carried out in the presence of a catalyst such as 1,8-diazabicyclo[5.4.0]-7-undecene (DBU) or ammonium molybdate and the like. Replacement can be carried out, for example, according to the following method: the original cation is removed through dialysis; and then a monovalent metal cation is added (for example, an alkali metal hydroxide is added). After completion of the reaction, the reaction product is treated according to an ordinary post-treatment method for organic synthesis reaction, whereby the phthalocyanine-based cyan dye (1), which has desired ozone resistance, represented by the general formula (3) can be obtained.

Next, a description is given of the substituent M, Pc(Cu), x and y in the general formula (4) of the cyan dye (2).

As described above, in the general formula (4), Pc(Cu) represents the copper phthalocyanine nucleus represented by the general formula (6). Each of an $SO_3M$ group and an $SO_2NH_2$ group is present on any of the four benzene rings A, B, C and D of the copper phthalocyanine nucleus represented by the general formula (6). In this instance, M represents a monovalent metal cation selected from a lithium ion, a sodium ion and a potassium ion. x is a number satisfying $0<x<4$, and y is a number satisfying $0<y<4$. Furthermore, x and y satisfy $2 \leqq x+y \leqq 5$, and preferably the sum of x and y is 4.

Specific examples of the cyan dye (2) include, but not limited to, compounds represented by chemical formulas (4-A) to (4-C) below.

(4-A)

The compound represented by the chemical formula (4-A) is an embodiment of the cyan dye (2), wherein, in the general formula (4), M is sodium ion; x is 1; y is 3; and one substituent is present on each of the four benzene rings A, B, C and D of the copper phthalocyanine nucleus represented by the general formula (6).

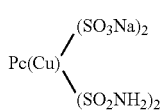
(4-B)

The compound represented by the chemical formula (4-B) is another embodiment of the cyan dye (2), wherein, in the general formula (4), M is sodium ion; both x and y are 2; and one substituent is present on each of the four benzene rings A, B, C and D of the copper phthalocyanine nucleus represented by the general formula (6).

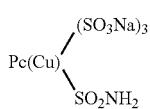
(4-C)

The compound represented by the chemical formula (4-C) is yet another embodiment of the cyan dye (2), wherein, in the general formula (4), M is sodium ion; x is 3; y is 1; and one substituent is present on each of the four benzene rings A, B, C and D of the copper phthalocyanine nucleus represented by the general formula (6).

The cyan dye (2) represented by the general formula (4) can be produced by a known copper phthalocyanine substitution method having, for example, the following steps (i), (ii) and (iii) or by other method.

Step (i)

First, copper phthalocyanine is chlorosulfonated with a chlorosulfonating agent. For example, an agent containing a mixture of chlorosulfonic acid and a chlorinating agent (phosphorus oxychloride or phosphorus trichloride) is employed as the chlorosulfonating agent. The molar ratio of the chlorosulfonic acid to the copper phthalocyanine compound (chlorosulfonic acid: copper phthalocyanine compound) is preferably within the range of from 5:1 to 200:1. The molar ratio of the chlorinating agent to copper phthalocyanine (chlorinating agent:copper phthalocyanine) is preferably within the range of from 0.5:1 to 10:1.

This chlorosulfonation reaction is carried out at a temperature ranging from 90° C. to 180° C. for 0.5 hours to 16 hours. Generally, the reaction time of the chlorosulfonation depends on the reaction temperature. The reaction time tends to be short as the reaction temperature is increased, and the reaction time tends to be long as the reaction temperature is decreased. Preferred temperature and time conditions for chlorosulfonation are in the range of 135° C. to 145° C. for 1.5 hours to 5.0 hours.

Furthermore, the chlorosulfonating agent may contain sulfuric acid. When the chlorosulfonating agent contains sulfuric acid, the molar ratio of sulfuric acid to the copper phthalocyanine compound (sulfuric acid: copper phthalocyanine compound) is preferably within the range of from 0.3:1 to 2:1.

Step (ii)

Next, the product obtained in step (i) is condensed with ammonia to obtain a compound represented by the chemical formula (4') below.

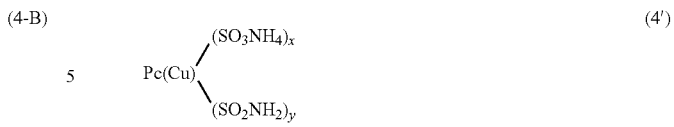
(4')

This step is carried out using ammonium hydroxide in an amount of 3 wt % to 35 wt % at a reaction temperature ranging of from 0° C. to 50° C. Generally, the reaction time depends on the reaction temperature. The reaction time tends to be short as the reaction temperature is increased, and the reaction time tends to be long as the reaction temperature is decreased. Preferred temperature and time conditions for the condensation reaction are a temperature of 0° C. to 45° C. for 0.5 hours to 24 hours.

Step (iii)

Next, $NH_4^+$ in the compound represented by the chemical formula (4') and obtained in step (ii) is replaced with a monovalent metal cation. In this metal cation replacement reaction, replacement can be carried out, for example, according to the following method. First, the product obtained in step (ii) is made acidic (for example, $NH_4^+$ is replaced with $H^+$ using hydrochloric acid). Then, the original cation is removed through dialysis, and a monovalent metal cation is added (for example, an alkali metal hydroxide is added). The copper phthalocyanine-based cyan dye (2) represented by the general formula (4) can be produced through the above steps.

Next, a description will be given of the substituents and Pc(Cu) in the general formula (5) of the cyan dye (3).

As described above, in the general formula (5), Pc(Cu) represents the copper phthalocyanine nucleus represented by the general formula (6). Each of an $SO_3NH_4$ group and an $SO_2NH_2$ group is present on any of the four benzene rings A, B, C and D of the copper phthalocyanine nucleus represented by the general formula (6).

The cyan dye (3) represented by the general formula (5) can be produced by a known copper phthalocyanine substitution method having, for example, the following steps (i) and (ii), or by other methods.

Step (i)

First, copper phthalocyanine is chlorosulfonated with a chlorosulfonating agent. For example, an agent containing a mixture of chlorosulfonic acid and a chlorinating agent (phosphorus oxychloride or phosphorus trichloride) is employed as the chlorosulfonating agent. The molar ratio of the chlorosulfonic acid to the copper phthalocyanine compound (chlorosulfonic acid: copper phthalocyanine compound) is preferably within the range of from 5:1 to 200:1. The molar ratio of the chlorinating agent to copper phthalocyanine (chlorinating agent copper phthalocyanine) is preferably within the range of from 0.5:1 to 10:1.

This chlorosulfonation reaction is carried out at a temperature ranging from 90° C. to 180° C. for 0.5 hours to 16 hours. Generally, the reaction time of the chlorosulfonation depends on the reaction temperature. The reaction time tends to be short as the reaction temperature is increased, and the reaction time tends to be long as the reaction temperature is decreased. Preferred temperature and time conditions for chlorosulfonation are a temperature of 135° C. to 145° C. for 1.5 hours to 5.0 hours.

Furthermore, the chlorosulfonating agent may contain sulfuric acid. When the chlorosulfonating agent contains sulfuric acid, the molar ratio of sulfuric acid to the copper phthalocyanine compound (sulfuric acid: copper phthalocyanine compound) is preferably within the range of from 0.3:1 to 2:1.

Step (ii)

Next, the product obtained in step (i) is condensed with ammonia to obtain a compound represented the by general formula (5) below.

(5)

This step is carried out using ammonium hydroxide in an amount of 3 wt % to 35 wt % at a reaction temperature ranging from 0° C. to 50° C. Generally, the reaction time depends on the reaction temperature. The reaction time tends to be short as the reaction temperature is increased, and the reaction time tends to be long as the reaction temperature is decreased. Preferred temperature and time conditions for the condensation reaction are a temperature of 0° C. to 45° C. for 0.5 hours to 24 hours.

As C. I. Direct Blue 86 which can be employed as the cyan coloring agent for the cyan ink of the present invention, a commercial product may be employed. In this instance, C. I. Direct Blue 86 is a dye represented by, for example, the following chemical structural formula.

Pc(Cu)—(SO$_3$Na)$_2$ C. I. Direct Blue 86 wherein Pc(Cu) represents the copper phthalocyanine nucleus represented by the general formula (6); and an SO$_3$Na group is present on any of the four benzene rings A, B, C and D of the copper phthalocyanine nucleus represented by the general formula (6).

A description will now be given of water and a water soluble organic solvent contained in each of the inks constituting the ink set for ink-jet recording of the present invention.

The water employed in the present invention is preferably ion exchanged water containing a small amount of salts. Each of the inks constituting the ink set for ink-jet recording contains various components in predetermined amounts, and the balance is made up with water. Therefore, the amount of water used depends on the amounts of the other components. The amount of water is based on the total weight of each of the inks and is normally in the range of about 10 wt % to about 90 wt % and is often in the range of about 40 wt % to about 80 wt %.

Examples of the water soluble organic solvent employed in the present invention include, but not limited to, a humectant for mainly preventing drying of ink at the end portion of the nozzles of an ink-jet head and a penetrant for mainly increasing drying speed on paper.

Examples of the humectant include, but not limited to, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like. Of these, polyalcohols such as alkylene glycols, glycols and the like are suitable.

The amount of the humectant in each of the inks for ink-jet recording is based on the total weight of each of the inks, and is generally in the range of 0 wt % to about 95 wt %, often in the range of about 10 wt % to about 80 wt %, and more often in the range of about 10 wt % to about 50 wt %.

Furthermore, examples of the penetrant include, but not limited to, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether and the like.

The amount of the penetrant in each of the inks for ink-jet recording is based on the total weight of each of the inks, and is generally in the range of 0 wt % to about 20 wt %, often in the range of about 0.1 wt % to about 15 wt % and more often in the range of about 1 wt % to about 10 wt %. It should be noted that, when the amount of the penetrant is too large, the penetrability of ink to paper becomes excessively high to cause blurring.

The ink-set for ink-jet recording of the present invention may contain other conventionally known additives including: viscosity modifiers such as polyvinyl alcohol, cellulose, water soluble resin and the like; surface tension modifiers; mildewproofing agents; and the like in accordance with need.

Each of the inks in the ink set for ink-jet recording of the present invention can be prepared by uniformly mixing water, the coloring agent, the water soluble organic solvents and, if necessary, other various additives by means of routine methods. The ink set for ink-jet recording can be produced by combining the prepared inks.

EXAMPLES

Preparation of Yellow Inks

The components of each of ink compositions shown in Table 1 were mixed uniformly, thereby preparing yellow inks. In this instance, C. I. Acid Yellow 23 employed for comparison has a structure shown below and has a basic structure different from that of C. I. Direct Yellow 132 and C. I. Direct Yellow 86.

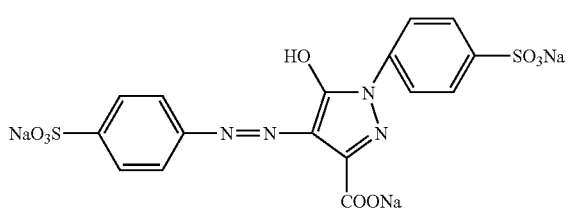

C. I. Acid Yellow 23

<Preparation of Magenta Inks>

The components of each of the ink compositions shown in Table 2 were mixed uniformly, thereby preparing magenta inks. Dyes (1-A) to (1-E) correspond to the compounds represented by the chemical formulas (1-A) to (1-E), respectively. Dye (2-A) corresponds to the compound represented by the chemical formula (2-A), and dye (2-C) corresponds to the compound represented by the chemical formula (2-C). Furthermore, dye (2-E) corresponds to the compound represented by the chemical formula (2-E). In addition to this, C. I. Direct Red 227 employed for comparison is a disazo-based dye and has a basic structure different from that of the magenta dye (1), the magenta dye (2), C. I. Acid Red 52 and C. I. Acid Red 289.

<Preparation of Cyan Inks>

The components of each of the ink compositions shown in Table 3 were mixed uniformly, thereby preparing cyan inks. Dyes (3-A) to (3-E) correspond to the compounds represented by the chemical formulas (3-A) to (3-E), respectively. Dyes (4-A) to (4-C) correspond to the compounds represented by the chemical formulas (4-A) to (4-C), respectively. Dye (5) corresponds to the compounds represented by the chemical formula (5). In addition to this, C. I. Acid Blue 9 employed for comparison is not a phthalocyanine-base dye and has the structure shown below. Therefore, C. I. Acid Blue 9 has a basic structure different from that of the cyan dye (1), the cyan dye (2), the cyan dye (3) and C. I. Direct Blue 86.

Criteria for Ejection Stability Evaluation

AA: No non-ejection and ejection bending occur during continuous printing.

A: Non-ejection or ejection bending occurs to a small extent during continuous printing. The non-ejection or ejection bending is rectified by repeating purging at most five times.

C: Non-ejection and ejection bending occur to a large extent during continuous printing. Neither the non-ejection nor ejection bending is rectified in a short time.

(b) Evaluation of Color Developing Properties of an Ink

Each of the above-listed gradation samples was visually observed to evaluate whether or not the color of each of the yellow, magenta and cyan inks was satisfactorily developed according to the following criteria.

Criteria for Evaluating Color Developing Properties of an Ink
A: Satisfactorily developed.
C: Not satisfactorily developed.

(c) Evaluation of Ozone Resistance of an Ink

An ozone resistance test was performed using the above gradation samples. The ozone resistance test was performed

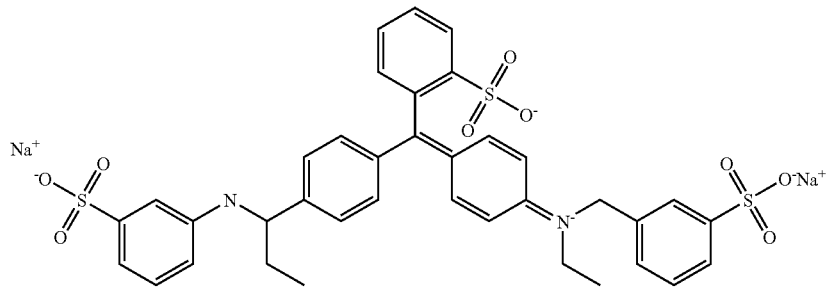

C. I. Acid Blue 9

<Evaluation of Inks>

For each of the obtained yellow, magenta and cyan inks, the following evaluations were performed: (a) evaluation of ejection stability, (b) evaluation of color developing properties of the ink, (c) evaluation of ozone resistance of the ink, (d) evaluation of light fastness of the ink, and (e) overall evaluation of the ink. The results obtained are shown in Tables 1 to 3.

First, each of the yellow, magenta and cyan inks was filled into a desired ink cartridge, and each ink cartridge was attached to a digital multifunction device equipped with an ink-jet printer (DCP-110C, product of Brother Industries, Ltd.) to perform the printing evaluation. As samples for (b) evaluation of color developing properties of the ink, (c) evaluation of ozone resistance of the ink, and (d) evaluation of light fastness of the ink, single-color gradation samples were printed on glossy paper (photo glossy paper (Model No. BP60GLA), product of Brother Industries, Ltd.). In this instance, each of the single-color gradation samples was printed with one of the yellow, magenta and yellow inks, and a patch having an initial OD (optical density) value of 1.0 was employed.

(a) Evaluation of Ejection Stability 100 million dots (about 30 thousands sheets) were continuously printed, and evaluation was made according to the following criteria.

by allowing the samples to stand in an atmosphere with an ozone concentration of 1 ppm, a chamber temperature of 24° C., and a humidity of 60% RH for 40 hours using an Ozone Weather Meter OMS-H (product of Suga Test Instruments Co., Ltd.). Each of the single-color patches printed with the yellow, magenta and yellow inks, respectively, and having an OD value of 1.0 before the test was measured for an OD value after the ozone resistance test. The OD values were measured by means of a Spectrolino (product of Gretag Macbeth) (light source: $D_{65}$; viewing angle: 2°; Status A). An OD value reduction ratio for ozone resistance with respect to the OD value (1.0) of the patch before the test was determined from equation (I) below. The obtained OD value reduction ratio for ozone resistance was evaluated according to the following criteria.

$$[OD \text{ value reduction ratio for ozone resistance}] = \{1.0 \ (OD \text{ value before test}) - (OD \text{ value after test})\} / \{1.0 \ (OD \text{ value before test})\} * 100 \quad \text{(Equation I)}$$

Criteria for Evaluating Ozone Resistance of an Ink

AA: The OD value reduction ratio for ozone resistance is less than 20%.

A: The OD value reduction ratio for ozone resistance is 20% or more and less than 30%.

B: The OD value reduction ratio for ozone resistance is 30% or more and less than 40%.

C: The OD value reduction ratio for ozone resistance is 40% or more.

(d) Evaluation of Light Fastness of an Ink

A light fastness test was performed using the above gradation samples. The light fastness test was conducted using a high energy xenon weather meter SC750-WN (product of Suga Test Instruments Co., Ltd.). The gradation samples were irradiated with light radiated from a xenon light source for 100 hours at a room temperature of 25° C., a humidity of 50% RH, and an illuminance of 93,000 Lux. Each of the single-color patches printed with the yellow, magenta and yellow inks, respectively, and having an OD value of 1.0 before the test was measured for an OD value after the light fastness test. The OD values were measured by means of a Spectrolino (product of Gretag Macbeth) (light source: $D_{65}$; viewing angle: 2°; Status A). An OD value reduction ratio for light fastness with respect to the OD value (1.0) of the patch before the test was determined from equation (II) below. The obtained OD value reduction ratio for light fastness was evaluated according to the following criteria.

$$[OD \text{ value reduction ratio for light fastness}] = \{1.0\ (OD\ \text{value before test}) - (OD\ \text{value after test})\} / \{1.0\ (OD\ \text{value before test})\} * 100 \quad \text{(Equation II)}$$

Criteria for Evaluating Light Fastness of an Ink

AA: The OD value reduction ratio for light fastness is less than 20%.

A: The OD value reduction ratio for light fastness is 20% or more and less than 30%.

B: The OD value reduction ratio for light fastness is 30% or more and less than 40%.

C: The OD value reduction ratio for light fastness is 40% or more.

(e) Overall Evaluation of an Ink

An overall evaluation was conducted based on the above evaluation results for each of the inks according to the following criteria.

Criteria for Overall Evaluation

G: All of the evaluation results are AA or A.

NG: The evaluation results contain B or C.

TABLE 1

|  |  |  | Yellow Ink | | | |
| --- | --- | --- | --- | --- | --- | --- |
|  |  |  | Y-1 | Y-2 | Y-3 | Y-4c |
| Ink Composition (wt %) | Dye I | C.I. Direct Yellow 132 | 1.5 | 2.1 | 2.8 | — |
|  | Dye II | C.I. Direct Yellow 86 | 0.5 | 0.9 | 1.2 | — |
|  | Comparison Dye | C.I. Acid Yellow 23 | — | — | — | 3.0 |
|  | Glycerin |  | 27.0 | 27.0 | 27.0 | 27.0 |
|  | Dipropylene glycol-n-propyl ether |  | 2.0 | 2.0 | 2.0 | 2.0 |
|  | OLFINE ® E1010 *1 |  | 0.2 | 0.2 | 0.2 | 0.2 |
|  | Proxel XL-2(S) *2 |  | 0.2 | 0.2 | 0.2 | 0.2 |
|  | Water |  | Balance | Balance | Balance | Balance |
| Ink | Weight ratio of dyes (C.I.DY132:C.I.DY86) |  | 75:25 | 70:30 | 70:30 | — |
|  | Total amount of dyes in ink (wt %) |  | 2.0 | 3.0 | 4.0 | 3.0 |
| Evaluation | Ejection stability |  | AA | AA | AA | AA |
|  | Color developing properties of ink |  | AA | AA | AA | A |
|  | Ozone resistance of ink |  | AA | AA | AA | C |
|  | OD value reduction rario of patch (initial OD = 1.0) (%) |  | 9 | 6 | 4 | 62 |
|  | Light fastness of ink |  | AA | AA | AA | C |
|  | OD value reduction rario of patch (initial OD = 1.0) (%) |  | 10 | 5 | 3 | 55 |
|  | Overall evaluation of ink |  | G | G | G | NG |

*1: Acetylene glycol-based surfactant (product of Nissin Chemical Industry Co., Ltd.)

*2: Mildewproofing agent (product of Arch Chemicals, Inc.)

TABLE 2

| | | | Magenta Ink | | | | | | | | | | |
|---|---|---|---|---|---|---|---|---|---|---|---|---|---|
| | | | M-1 | M-2 | M-3 | M-4 | M-5 | M-6 | M-7 | M-8c | M-9c | M-10c | M-11c |
| Ink composition (wt %) | Dye I | Dye (1-A) | — | 2.7 | — | — | — | — | — | 3.0 | — | — | — |
| | | Dye (1-B) | 2.85 | — | 2.4 | — | 1.8 | — | — | — | — | — | — |
| | | Dye (1-C) | — | — | — | 2.1 | — | — | — | — | — | — | — |
| | | Dye (1-D) | — | — | — | — | — | 1.6 | — | — | 2.4 | — | — |
| | | Dye (1-E) | — | — | — | — | — | — | 3.2 | — | — | — | — |
| | Dye II | Dye (2-A) | — | — | — | — | — | — | — | — | — | 3.0 | — |
| | | Dye (2-C) | — | — | — | 0.9 | — | — | — | — | — | — | — |
| | | Dye (2-E) | 0.15 | — | — | — | — | — | 0.8 | — | — | — | — |
| | | C.I. Acid Red 52 | — | 0.3 | — | — | 1.2 | — | — | — | — | — | — |
| | | C.I. Acid Red 289 | — | — | 0.6 | — | — | 0.4 | — | — | — | — | — |
| | Comparison Dye | C.I. Direct Red 227 | — | — | — | — | — | — | — | — | 0.6 | — | 3.0 |
| | | Glycerin | 27.0 | 27.0 | 27.0 | 27.0 | 27.0 | 27.0 | 27.0 | 27.0 | 27.0 | 27.0 | 27.0 |
| | | Dipropylene glycol-n-propyl ether | 2.0 | 2.0 | 2.0 | 2.0 | 2.0 | 2.0 | 2.0 | 2.0 | 2.0 | 2.0 | 2.0 |
| | | OLFINE ® E1010 *1 | 0.2 | 0.2 | 0.2 | 0.2 | 0.2 | 0.2 | 0.2 | 0.2 | 0.2 | 0.2 | 0.2 |
| | | Proxel XL-2(S) *2 | 0.2 | 0.2 | 0.2 | 0.2 | 0.2 | 0.2 | 0.2 | 0.2 | 0.2 | 0.2 | 0.2 |
| | | Water | | | | | | Balance | | | | | |
| Ink | | Weight ratio of dyes (Dye I:Dye II) | 95:5 | 90:10 | 80:20 | 70:30 | 60:40 | 80:20 | 80:20 | — | (80:20)*3 | — | — |
| Evaluation | | Total amount of dyes in ink (wt %) | 3.0 | 3.0 | 3.0 | 3.0 | 3.0 | 2.0 | 4.0 | 3.0 | 3.0 | 3.0 | 3.0 |
| | | Ejection stability | A | AA | AA | AA | AA | AA | AA | C | AA | AA | AA |
| | | Color developing properties of ink | A | A | A | A | A | A | A | C | C | A | C |
| | | Ozone resistance of ink | AA | AA | AA | AA | A | AA | AA | AA | B | C | C |
| | | OD value reduction ratio of patch (initial OD = 1.0) (%) | 4 | 8 | 6 | 15 | 28 | 9 | 3 | 2 | 35 | 58 | 60 |
| | | Light fastness of ink | AA | AA | AA | AA | A | AA | AA | AA | AA | C | C |
| | | OD value reduction ratio of patch (initial OD = 1.0) (%) | 5 | 5 | 7 | 9 | 24 | 8 | 7 | 4 | 18 | 40 | 51 |
| | | Overall evaluation of ink | G | G | G | G | G | G | G | NG | NG | NG | NG |

*1: Acetylene glycol-based surfactant (product of Nissin Chemical Industry Co., Ltd.)
*2: Mildewproofing agent (product of Arch Chemicals, Inc.)
*3 For M-9c, weight ratio of dye I and comparison dye (C.I. Direct Red 227)

TABLE 3

| | | | Cyan Ink | | | | | | | | | | |
|---|---|---|---|---|---|---|---|---|---|---|---|---|---|
| | | | C-1 | C-2 | C-3 | C-4 | C-5 | C-6 | C-7 | C-8c | C-9c | C-10c | C-11c |
| Ink composition (wt %) | Dye I | Dye (3-A) | 3.88 | 3.72 | — | — | — | — | — | 4.0 | — | — | — |
| | | Dye (3-B) | — | — | 3.2 | — | 2.4 | — | — | — | — | — | — |
| | | Dye (3-C) | — | — | — | 2.8 | — | — | — | — | 3.2 | — | — |
| | | Dye (3-D) | — | — | — | — | — | 2.4 | — | — | — | — | — |
| | | Dye (3-E) | — | — | — | — | — | — | 4.0 | — | — | — | — |
| | Dye II | Dye (4-A) | 0.12 | — | — | — | — | — | — | — | — | 3.0 | — |
| | | Dye (4-B) | — | — | — | — | — | 1.0 | — | — | — | — | — |
| | | Dye (4-C) | — | — | — | 1.2 | — | — | — | — | — | — | — |
| | | Dye (5) | — | 0.28 | — | — | 1.6 | — | — | — | — | — | — |
| | | C.I. Direct Blue 86 | — | — | 0.8 | — | — | 0.6 | — | — | — | — | — |
| | Comparison Dye | C.I. Acid Blue 9 | — | — | — | — | — | — | — | — | 0.8 | — | 3.0 |
| | | Glycerin | 27.0 | 27.0 | 27.0 | 27.0 | 27.0 | 27.0 | 27.0 | 27.0 | 27.0 | 27.0 | 27.0 |
| | | Dipropylene glycol-n-propyl ether | 2.0 | 2.0 | 2.0 | 2.0 | 2.0 | 2.0 | 2.0 | 2.0 | 2.0 | 2.0 | 2.0 |
| | | OLFINE ® E1010 *1 | 0.2 | 0.2 | 0.2 | 0.2 | 0.2 | 0.2 | 0.2 | 0.2 | 0.2 | 0.2 | 0.2 |
| | | Proxel XL-2(S) *2 | 0.2 | 0.2 | 0.2 | 0.2 | 0.2 | 0.2 | 0.2 | 0.2 | 0.2 | 0.2 | 0.2 |
| | | Water | | | | | | Balance | | | | | |
| Ink | | Weight ratio of dyes (Dye I:Dye II) | 97:3 | 93:7 | 80:20 | 70:30 | 60:40 | 80:20 | 80:20 | — | (80:20)*3 | — | — |
| Evaluation | | Total amount of dyes in ink (wt %) | 4.0 | 4.0 | 4.0 | 4.0 | 4.0 | 3.0 | 5.0 | 4.0 | 4.0 | 3.0 | 3.0 |
| | | Ejection stability | A | AA | AA | AA | AA | AA | AA | C | AA | AA | AA |
| | | Color developing properties of ink | A | A | A | A | A | A | A | C | A | A | A |
| | | Ozone resistance of ink | AA | AA | AA | AA | A | AA | AA | AA | B | B | C |
| | | OD value reduction ratio of patch (initial OD = 1.0) (%) | 8 | 11 | 13 | 15 | 28 | 11 | 12 | 7 | 34 | 38 | 63 |
| | | Light fastness of ink | AA | AA | AA | AA | AA | AA | AA | AA | B | AA | C |
| | | OD value reduction ratio of patch (initial OD = 1.0) (%) | 4 | 4 | 5 | 4 | 6 | 5 | 4 | 3 | 32 | 3 | 52 |
| | | Overall evaluation of ink | G | G | G | G | G | G | G | NG | NG | NG | NG |

*1: Acetylene glycol-based surfactant (product of Nissin Chemical Industry Co., Ltd.)
*2: Mildewproofing agent (product of Arch Chemicals, Inc.)
*3 For C-9c, weight ratio of dye I and comparison dye (C.I. Acid Blue 9)

As described above, in each of the yellow inks Y-1 to Y-3, C. I. Direct Yellow 132 and C. I. Direct Yellow 86 were employed as the yellow coloring agents. Therefore, as can be seen from Table 1, for each of the yellow inks Y-1 to Y-3, favorable results were obtained in (a) the evaluation of ejection stability, (b) the evaluation of color developing properties of the ink, (c) the evaluation of ozone resistance of the ink, (d) the evaluation of light fastness of the ink, and (e) the overall evaluation of the ink. Conversely, for yellow ink Y-4c in which C. I. Direct Yellow 132 and C. I. Direct Yellow 86 were not employed, favorable results were not obtained particular in (c) the evaluation of ozone resistance of the ink and (d) the evaluation of light fastness of the ink. In addition to this, the results of (e) the overall evaluation of the ink were also unfavorable.

As described above, in each of the magenta inks M-1 to M-7, different types of dyes were employed as the magenta coloring agent. In particular, the magenta dye (1) represented by the general formula (1) was employed together with at least one dye selected from the group consisting of the magenta dye (2) represented by the general formula (2) in a free acid form, C. I. Acid Red 52 and C. I. Acid Red 289. Therefore, as can be seen from Table 2, for each of the magenta inks M-1 to M-7, favorable results were obtained in (a) the evaluation of ejection stability, (b) the evaluation of color developing properties of the ink, (c) the evaluation of ozone resistance of the ink, (d) the evaluation of light fastness of the ink, and (e) the overall evaluation of the ink. Conversely, for each of magenta inks M-8c to M-11c in which one or both of the above dyes were not employed, favorable results were not obtained in some of the individual evaluation results, and the results of (e) the overall evaluation of the ink were also unfavorable.

As described above, in each of the cyan inks C-1 to C-7, different types of dyes were employed as the cyan coloring agent. In particular, the cyan dye (1) represented by the general formula (3) was employed together with at least one dye selected from the group consisting of the cyan dye (2) represented by the general formula (4), the cyan dye (3) represented by the general formula (5) and C. I. Direct Blue 86. Therefore, as can be seen from Table 3, for each of the cyan inks C-1 to C-7, favorable results were obtained in (a) the evaluation of ejection stability, (b) the evaluation of color developing properties of the ink, (c) the evaluation of ozone resistance of the ink, (d) the evaluation of light fastness of the ink, and (e) the overall evaluation of the ink. Conversely, for each of cyan inks C-8c to C-11c in which one or both of the above dyes were not employed, favorable results were not obtained in some of the individual evaluation results, and the results of (e) the overall evaluation of the ink were also unfavorable.

Formation of Ink Sets for Ink-Jet Recording

Examples 1 to 13 and Comparative Examples 1 to 15

Each of the ink sets for ink-jet recording of the present invention was formed by combining the yellow, magenta and cyan inks as shown in Tables 4 and 5. In each of the ink sets for ink-jet recording of Examples 1 to 13, an ink having favorable results (G) for (e) the overall evaluation of the ink was employed for each of the yellow, magenta and cyan inks forming the ink sets. Conversely, in each of the ink sets of Comparative Examples 1 to 15, an ink having unfavorable results (NG) for (e) the overall evaluation of the ink was employed for at least one of the yellow, magenta and cyan inks forming the ink sets.

<Evaluation of Ink Sets for Ink-Jet Recording>

The inks filled in the respective ink cartridges were combined as shown in Tables 4 and 5 to form ink sets for ink-jet recording, and each of the ink sets was attached to a digital multifunction device equipped with an ink-jet printer (DCP-110C, product of Brother Industries, Ltd.) to perform printing. For each of the printed materials obtained, the following evaluations were performed: (f) evaluation of color developing properties of the ink set, (g) evaluation of ozone resistance of the ink set, (h) evaluation of light fastness of the ink set, and (i) overall evaluation of the ink set. The obtained results are shown in Tables 4 and 5. In this instance, a natural image sample (JIS SCID No. 2) was printed on glossy paper (photo glossy paper (Model No. BP60GLA), product of Brother Industries, Ltd.) and was employed as the evaluation sample employed in these evaluation tests.

(f) Evaluation of Color Developing Properties of an Ink Set

The above natural image sample for each of the ink sets was visually observed to evaluate whether or not the color balance of the ink set was satisfactory according to the following criteria.

Criteria for Evaluating Color Developing Properties of an Ink Set

A: Satisfactory.

C: Not satisfactory.

(g) Evaluation of Ozone Resistance of an Ink Set

The above natural image sample was allowed to stand in an atmosphere with an ozone concentration of 1 ppm, a chamber temperature of 24° C., and a humidity of 60% RH for 40 hours using an Ozone Weather Meter OMS-H (product of Suga Test Instruments Co., Ltd.). Subsequently, the images were visually observed to evaluate colors according to the following criteria.

Criteria for Evaluating Ozone Resistance of an Ink Set

A: The colors of the image are not found to be changed.

C: The colors of the image are found to be changed.

(h) Evaluation of Light Fastness of an Ink Set

The above natural image sample was irradiated with light radiated from a xenon light source for 100 hours at a room temperature of 25° C., a humidity of 50% RH, and an illuminance of 93,000 Lux using a high energy xenon weather meter SC750-WN (product of Suga Test Instruments Co., Ltd.). Subsequently, the image was visually observed for evaluating colors according to the following criteria.

Criteria for Evaluating Light Fastness of an Ink Set

A: The colors of the image are not found to be changed.

C: The colors of the image are found to be changed.

(i) Overall Evaluation of an Ink Set

An overall evaluation was conducted based on the above evaluation results for each of the ink sets according to the following criteria.

Criteria for Overall Evaluation of an Ink Set

G: All of the evaluation results are AA or A.

NG: The evaluation results contain B or C.

TABLE 4

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Ink set | Y ink | Y-1 | Y-2 | Y-3 | Y-1 | Y-2 | Y-3 | Y-1 | Y-2 | Y-3 | Y-1 | Y-2 | Y-3 | Y-1 |
|  | M ink | M-1 | M-2 | M-3 | M-4 | M-5 | M-6 | M-7 | M-1 | M-2 | M-3 | M-5 | M-6 | M-7 |
|  | C ink | C-1 | C-2 | C-3 | C-4 | C-5 | C-6 | C-7 | C-7 | C-6 | C-5 | C-3 | C-2 | C-1 |
| Evaluation | Color developing properties of ink set | A | A | A | A | A | A | A | A | A | A | A | A | A |
|  | Ozone resistance of ink set | A | A | A | A | A | A | A | A | A | A | A | A | A |
|  | Light fastness of ink set | A | A | A | A | A | A | A | A | A | A | A | A | A |
|  | Overall evaluation of ink set | A | A | A | A | A | A | A | A | A | A | A | A | A |

TABLE 5

|  |  | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| Ink set | Y ink | Y-4c | Y-4c | Y-1 | Y-4c | Y-4c | Y-2 | Y-4c | Y-4c |
|  | M ink | M-8c | M-8c | M-8c | M-9c | M-9c | M-9c | M-10c | M-10c |
|  | C ink | C-8c | C-1 | C-9c | C-10c | C-2 | C-11c | C-8c | C-3 |
| Evaluation | Color developing properties of ink set | C | C | C | C | C | C | C | C |
|  | Ozone resistance of ink set | C | C | C | C | C | C | C | C |
|  | Light fastness of ink set | C | C | C | C | C | C | C | C |
|  | Overall evaluation of ink set | C | C | C | C | C | C | C | C |

|  |  | Com. Ex. 9 | Com. Ex. 10 | Com. Ex. 11 | Com. Ex. 12 | Com. Ex. 13 | Com. Ex. 14 | Com. Ex. 15 |
|---|---|---|---|---|---|---|---|---|
| Ink set | Y ink | Y-3 | Y-4c | Y-4c | Y-1 | Y-4c | Y-2 | Y-3 |
|  | M ink | M-10c | M-11c | M-11c | M-11c | M-1 | M-8c | M-2 |
|  | C ink | C-9c | C-10c | C-4 | C-11c | C-5 | C-6 | C-8c |
| Evaluation | Color developing properties of ink set | C | C | C | C | A | C | C |
|  | Ozone resistance of ink set | C | C | C | C | C | A | A |
|  | Light fastness of ink set | C | C | C | C | C | A | A |
|  | Overall evaluation of ink set | C | C | C | C | C | C | C |

In each of the ink sets of Examples 1 to 13, an ink having good results for (e) the overall evaluation of the ink was employed for each of the yellow, magenta and cyan inks. Therefore, for each of these ink sets, favorable results were obtained in (f) the evaluation of color developing properties of the ink set, (g) the evaluation of ozone resistance of the ink set, and (h) the evaluation of light fastness of the ink set. Hence, the results of (i) the overall evaluation were also favorable.

Conversely, in each of the ink sets of Comparative Examples 1, 4, 7 and 10, an ink having unfavorable results in (e) the overall evaluation of the ink was employed for each of the yellow, magenta and cyan inks. Therefore, for each of these ink sets, unfavorable results were obtained in (f) the evaluation of color developing properties of the ink set, (g) the evaluation of ozone resistance of the ink set, and (h) the evaluation of light fastness of the ink set. Hence, the results of (i) the overall evaluation were also unfavorable.

In each of the ink sets of Comparative Examples 2, 3, 5, 6, 8, 9, 11 and 12, an ink having unfavorable results in (e) the overall evaluation of the ink was employed for two of the yellow, magenta and cyan inks. Therefore, for each of these ink sets, unfavorable results were obtained in (f) the evaluation of color developing properties of the ink set, (g) the evaluation of ozone resistance of the ink set, and (h) the evaluation of light fastness of the ink set. Hence, the results of (i) the overall evaluation were also unfavorable.

In the ink set of Comparative Example 13, an ink having unfavorable results in (e) the overall evaluation of the ink was employed for the yellow ink among the yellow, magenta and cyan inks. Therefore, although favorable results were obtained in (f) the evaluation of color developing properties of the ink set, unfavorable results were obtained in (g) the evaluation of ozone resistance of the ink set and (h) the evaluation of light fastness of the ink set. Hence, the results of (i) the overall evaluation were also unfavorable.

In the ink set of Comparative Example 14, an ink having unfavorable results in (e) the overall evaluation of the ink was employed for the magenta ink among the yellow, magenta and cyan inks. Therefore, although favorable results were obtained in (g) the evaluation of ozone resistance of the ink set and (h) the evaluation of light fastness of the ink set, unfavorable results were obtained in (f) the evaluation of color developing properties of the ink set. Hence, the results of (i) the overall evaluation were also unfavorable.

In the ink set of Comparative Example 15, an ink having unfavorable results of (e) the overall evaluation of the ink was employed for the cyan ink among the yellow, magenta and cyan inks. Therefore, although favorable results were obtained in (g) the evaluation of ozone resistance of the ink set and (h) the evaluation of light fastness of the ink set, unfavorable results were obtained in (f) the evaluation of color developing properties of the ink set. Hence, the results of (i) the overall evaluation were also unfavorable.

The entire disclosure of the specification, claims and summary of Japanese Patent Application No. 2006-38766 filed on Feb. 16, 2006 is hereby incorporated by reference.

What is claimed is:

1. An ink set for ink-jet recording, comprising:
   a yellow ink containing a yellow coloring agent, water and a water soluble organic solvent;
   a magenta ink containing a magenta coloring agent, water and a water soluble organic solvent; and
   a cyan ink containing a cyan coloring agent, water and a water soluble organic solvent,
   wherein the yellow ink contains, as the yellow coloring agent, C. I. Direct Yellow 132 and C. I. Direct Yellow 86,
   wherein the magenta ink contains, as the magenta coloring agent, a magenta dye (1) and at least one dye selected from the group consisting of a magenta dye (2), C. I. Acid Red 52 and C. I. Acid Red 289,
the magenta dye (I) being represented by the general formula (1):

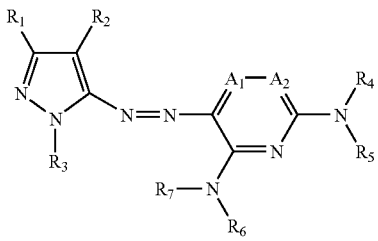

(1)

wherein $R_1$ represents a hydrogen atom, an optionally substituted alkyl group or an optionally substituted aryl group; $R_2$ represents a hydrogen atom, a halogen atom or a cyano group; $R_3$ represents a hydrogen atom, an optionally substituted alkyl group, an optionally substituted aryl group or an optionally substituted heterocyclic group; $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, provided that $R_4$ and $R_5$ are not simultaneously hydrogen atoms and that $R_6$ and $R_7$ are not simultaneously hydrogen atoms; and $A_1$ and $A_2$ are both optionally substituted carbon atoms, or one of $A_1$ and $A_2$ is an optionally substituted carbon atom and the other is a nitrogen atom, the magenta dye (2) being represented by the general formula (2) in a free acid form:

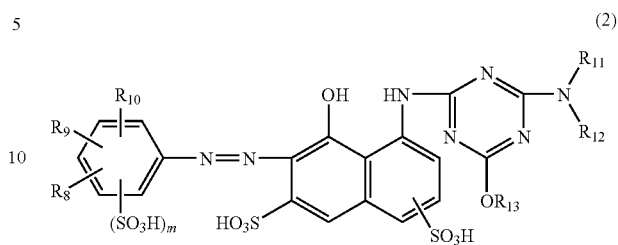

(2)

wherein $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group or a carboxylate group; m represents a number of 0, 1 or 2; and $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group, and
   wherein the cyan ink contains, as the cyan coloring agent, a cyan dye (1) represented by the general formula (3) and at least one dye selected from the group consisting of a cyan dye (2) represented by the general formula (4), a cyan dye (3) represented by the general formula (5) and C. I. Direct Blue 86:

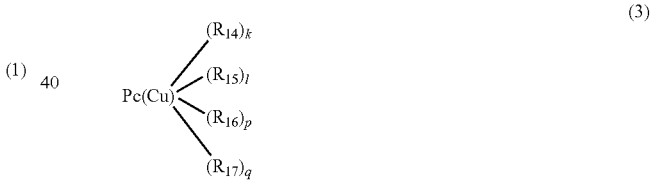

(3)

(4)

(5)

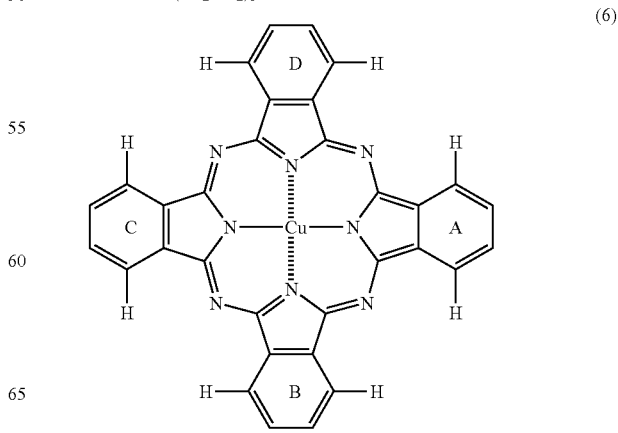

(6)

wherein, in the general formulas (3) to (5), Pc(Cu) represents a copper phthalocyanine nucleus represented by the general formula (6), wherein, in the general formula (3), k is a number satisfying $0<k<8$; l is a number satisfying $0<l<8$; p is a number satisfying $0\leq p<8$; q is a number satisfying $0\leq q<8$; k, l, p and q satisfy $4\leq k+l+p+q\leq 8$; and $R_{14}$, $R_{15}$, $R_{16}$ and $R_{17}$ each independently represent a substituent selected from the group consisting of $—SO_2—R_a$, $—SO_2NR_bR_c$ and $—CO_2—R_a$, provided that $R_{14}$, $R_{15}$, $R_{16}$ and $R_{17}$ are not simultaneously the same, that at least one of $R_{14}$, $R_{15}$, $R_{16}$ and $R_{17}$ has an ionic hydrophilic group as a substituent, and that at least one or more of $R_{14}$, $R_{15}$, $R_{16}$ and $R_{17}$ is present on each of four benzene rings A, B, C and D of the copper phthalocyanine nucleus represented by general formula (6), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, wherein, in the general formula (4), each of an $SO_3M$ group and an $SO_2NH_2$ group is present on any of the four benzene rings A, B, C and D of the copper phthalocyanine nucleus represented by the general formula (6); M represents a monovalent metal cation selected from the group consisting of a lithium ion, a sodium ion and a potassium ion; x is a number satisfying $0<x<4$; y is a number satisfying $0<y<4$; and x and y satisfy $2\leq x+y\leq 5$, and wherein, in the general formula (5), each of an $SO_3NH_4$ group and an $SO_2NH_2$ group is present on any of the four benzene rings A, B, C and D of the copper phthalocyanine nucleus represented by the general formula (6).

2. The ink set for ink-jet recording according to claim 1, wherein the yellow coloring agent of the yellow ink contains C. I. Direct Yellow 132 and C. I. Direct Yellow 86 in a ratio by weight of about 70:30 to about 90:10, wherein the magenta coloring agent of the magenta ink contains the magenta dye (1) and at least one dye selected from the group consisting of the magenta dye (2), C. I. Acid Red 52 and C. I. Acid Red 289 in a ratio by weight of about 70:30 to about 90:10, and wherein the cyan coloring agent of the cyan ink contains the cyan dye (1) and at least one dye selected from the group consisting of the cyan dye (2), the cyan dye (3) and C. I. Direct Blue 86 in a ratio by weight of about 70:30 to about 95:5.

3. The ink set for ink-jet recording according to claim 1, wherein an amount of the yellow coloring agent in the yellow ink is about 1 wt % to about 5 wt % based on the total weight of the yellow ink, an amount of the magenta coloring agent in the magenta ink is about 1 wt % to about 5 wt % based on the total weight of the magenta ink, and an amount of the cyan coloring agent in the cyan ink is about 1 wt % to about 5 wt % based on the total weight of the cyan ink.

4. The ink set for ink-jet recording according to claim 1, wherein, in the general formula (1), $R_1$ is an alkyl group; $R_2$ is a cyano group; $R_3$ is a hydrogen atom or an optionally substituted heterocyclic group; $R_4$ is a hydrogen atom, an optionally substituted heterocyclic group or a substituted aryl group; $R_5$ and $R_6$ are each independently a substituted heterocyclic group or a substituted aryl group; $R_7$ is a hydrogen atom; $A_1$ is a substituted carbon atom; and $A_2$ is an optionally substituted carbon atom.

5. The ink set for ink-jet recording according to claim 4, wherein, in the general formula (1), $R_1$ is a tert-butyl group; $R_3$ is a hydrogen atom or a benzothiazolyl group optionally substituted by a sulfonic acid group or an alkali metal sulfonate group; $R_4$ is a hydrogen atom, a benzothiazolyl group optionally substituted by a sulfonic acid group or an alkali metal sulfonate group, or a trialkylphenyl group substituted by a sulfonic acid group or an alkali metal sulfonate group; $R_5$ and $R_6$ are each independently a monoalkylphenyl or trialkylphenyl group optionally substituted by a sulfonic acid group or an alkali metal sulfonate group, or a benzothiazolyl group substituted by a sulfonic acid group or an alkali metal sulfonate group; $A_1$ is a carbon atom substituted by an alkyl group; and $A_2$ is a carbon atom optionally substituted by a cyano group.

6. The ink set for ink-jet recording according to claim 5, wherein, in the general formula (1), $R_3$ is a hydrogen atom or a benzothiazole-2-yl group optionally substituted by a sulfonic acid group or an alkali metal sulfonate group; $R_4$ is a hydrogen atom, a benzothiazole-2-yl group optionally substituted by a sulfonic acid group or an alkali metal sulfonate group, or a trimethylphenyl group substituted by a sulfonic acid group or an alkali metal sulfonate group; $R_5$ and $R_6$ are each independently a p-octylphenyl group optionally substituted by a sulfonic acid group or an alkali-metal sulfonate group, or mesityl group optionally substituted by a sulfonic acid group or an alkali metal sulfonate group, or a benzothiazole-2-yl group substituted by a sulfonic acid group or an alkali metal sulfonate group; and $A_1$ is a carbon atom substituted by a methyl group.

7. The ink set for ink-jet recording according to claim 1, wherein, in the general formula (2), m is 0; $R_8$ is a carboxyl group, a carbamoyl group, a trifluoromethyl group or a sulfamoyl group; $R_9$ and $R_{10}$ are a hydrogen atom; $R_{11}$ is a carboxyalkyl group or a phenyl group optionally substituted by a carboxyl group or a sulfamoyl group; $R_{12}$ is a hydrogen atom; and $R_{13}$ is a hydrogen atom or an alkyl group.

8. The ink set for ink-jet recording according to claim 1, wherein, in the general formula (3), $R_{14}$, $R_{15}$, $R_{16}$ and $R_{17}$ are substituents represented by $—SO_2R_a$, wherein $R_a$ is a substituted or unsubstituted alkyl group, provided that not all the four substituted or unsubstituted alkyl groups $R_a$ in $R_{14}$, $R_{15}$, $R_{16}$ and $R_{17}$ are completely identical.

9. The ink set for ink-jet recording according to claim 1, wherein, in the general formula (3), k is a number satisfying $0<k<4$; l is a number satisfying $0<l<4$; p is a number satisfying $0\leq p<4$; q is a number satisfying $0\leq q<4$; and the sum of k, l, p and q is 4.

10. The ink set for ink-jet recording according to claim 1, wherein, in the general formula (4), x is a number satisfying $0<x<4$; y is a number satisfying $0<y\leq 4$; and the sum of x and y is 4.

* * * * *

UNITED STATES PATENT AND TRADEMARK OFFICE

CERTIFICATE OF CORRECTION

| | | |
|---|---|---|
| PATENT NO. | : 7,713,343 B2 | Page 1 of 1 |
| APPLICATION NO. | : 11/673821 | |
| DATED | : May 11, 2010 | |
| INVENTOR(S) | : Kazuma Goto et al. | |

It is certified that error appears in the above-identified patent and that said Letters Patent is hereby corrected as shown below:

In Column 42, Claim 10, Line 55:

Please delete "$0<y\geqq4$" and insert -- $0<y<4$ --.

Signed and Sealed this

Fourth Day of January, 2011

David J. Kappos
*Director of the United States Patent and Trademark Office*